(12) United States Patent
Sasaki et al.

(10) Patent No.: US 6,353,995 B1
(45) Date of Patent: Mar. 12, 2002

(54) THIN FILM MANGETIC HEAD AND METHOD OF MANUFACTURING SAME

(75) Inventors: Yoshitaka Sasaki; Atsushi Iijima, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/459,651

(22) Filed: Dec. 13, 1999

(30) Foreign Application Priority Data

Dec. 11, 1998 (JP) .......................... 10-353422
Dec. 31, 1998 (JP) .......................... 10-377562

(51) Int. Cl.[7] .................... G11B 5/127; G11B 5/39
(52) U.S. Cl. ..................... 29/603.14; 360/317
(58) Field of Search .................. 29/603.14, 603.15, 29/603.16; 360/317

(56) References Cited

U.S. PATENT DOCUMENTS

| | | | |
|---|---|---|---|
| 5,325,254 A | * | 6/1994 | Cooperrider ............... 360/126 |
| 5,640,753 A | * | 6/1997 | Schultz et al. ............ 29/603.08 |
| 5,684,660 A | * | 11/1997 | Gray et al. ............... 360/126 |

* cited by examiner

Primary Examiner—George J. Letscher
(74) Attorney, Agent, or Firm—Oliff & Berridge, PLC

(57) ABSTRACT

A insulating layer having a opening corresponding to a bottom pole tip is formed on a bottom pole layer. The insulating layer is made of a insulating material such as alumina and formed by, for example, sputtering or CVD. On the insulating layer and the bottom pole layer, a magnetic layer is formed. Subsequently, the magnetic layer is planarized to expose the surface of the insulating layer by CMP (Chemical and Mechanical Polishing). By this step, a bottom pole tip adjacent to the insulating layer is formed on the bottom pole layer. Using this method, it is easy to manufacture a structure that the magnetic pole and the insulating layer lie contiguously and a throat height of a recording head is determined precisely.

2 Claims, 16 Drawing Sheets

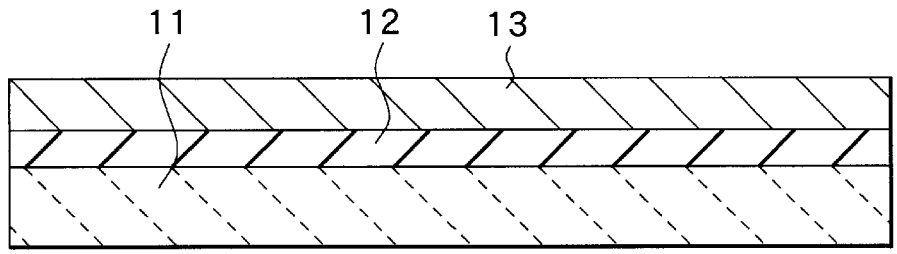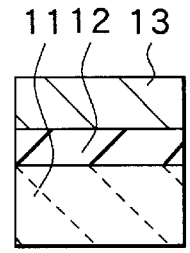
FIG.1A  FIG.1B
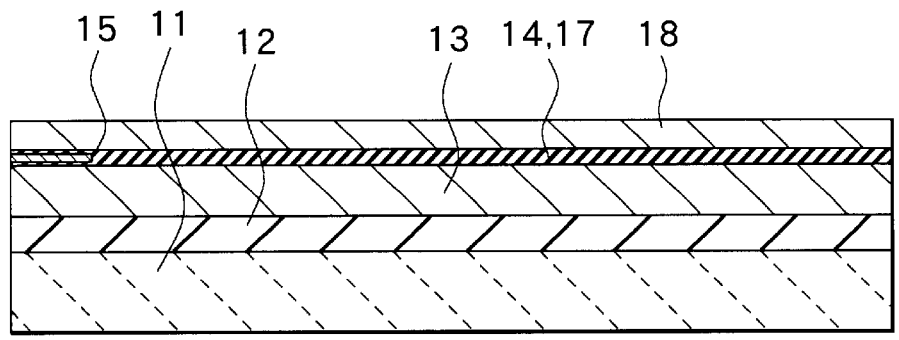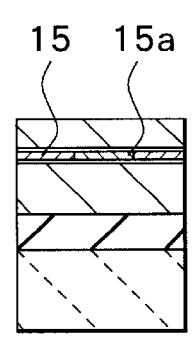
FIG.2A  FIG.2B
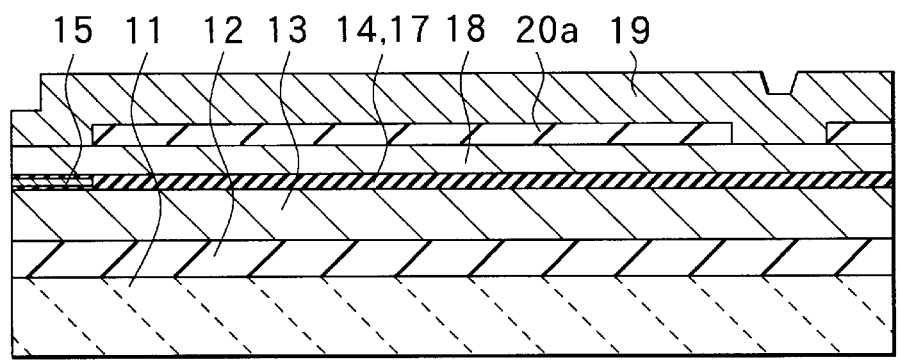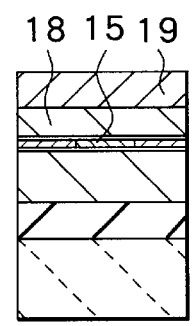
FIG.3A  FIG.3B

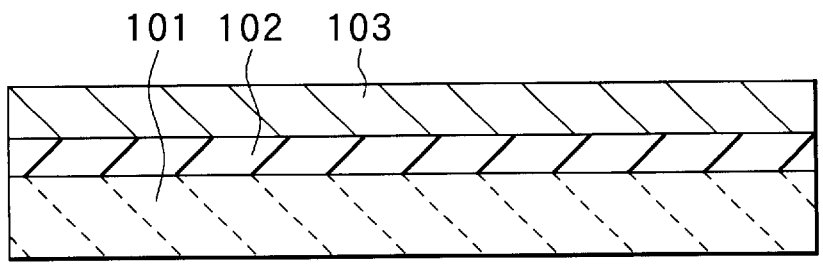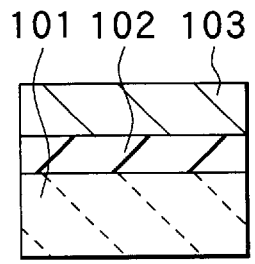
FIG.16A    FIG.16B
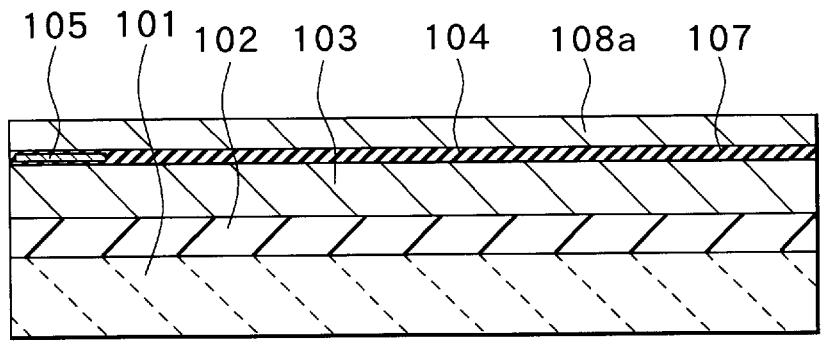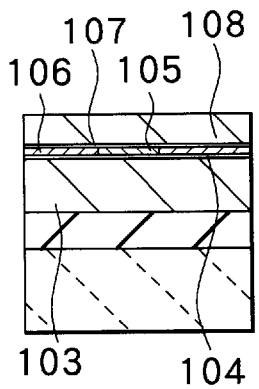
FIG.17A    FIG.17B
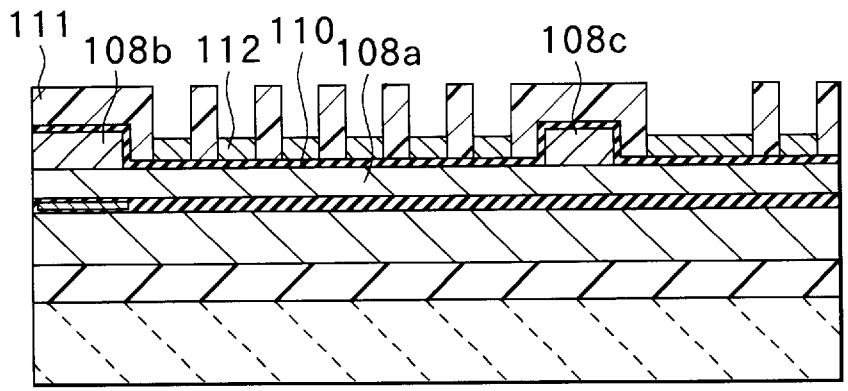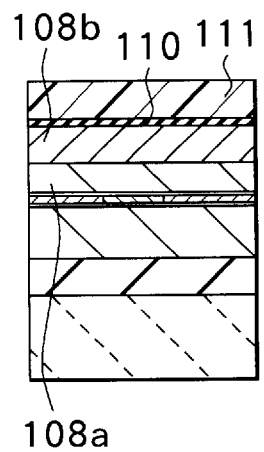
FIG.18A    FIG.18B

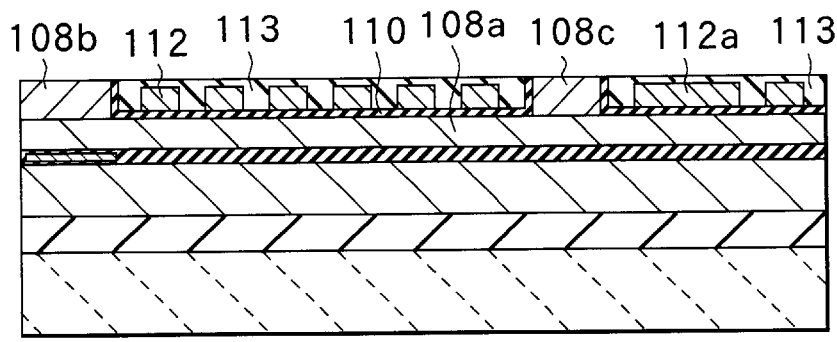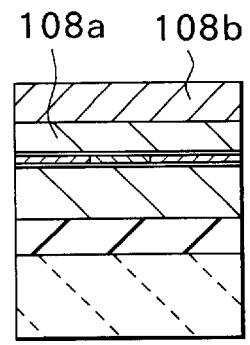
FIG.19A　　　　　FIG.19B
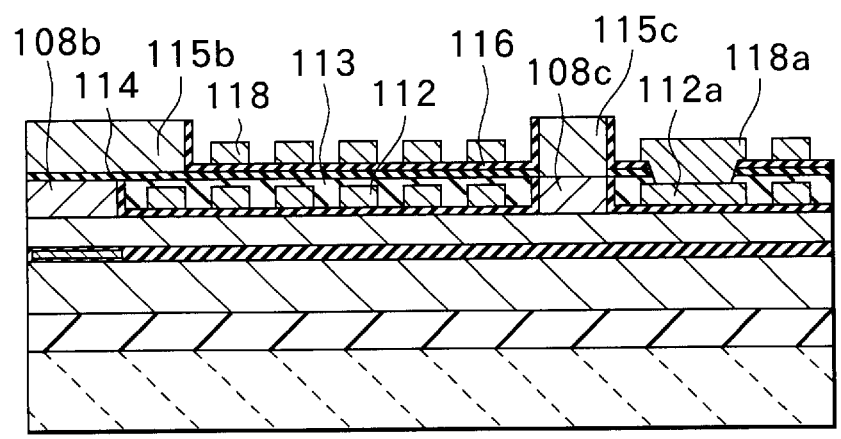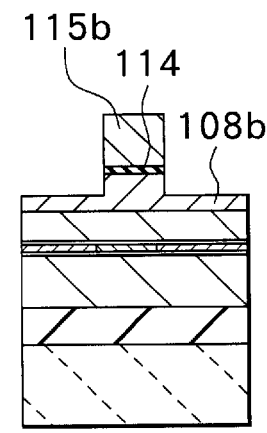
FIG.20A　　　　　FIG.20B

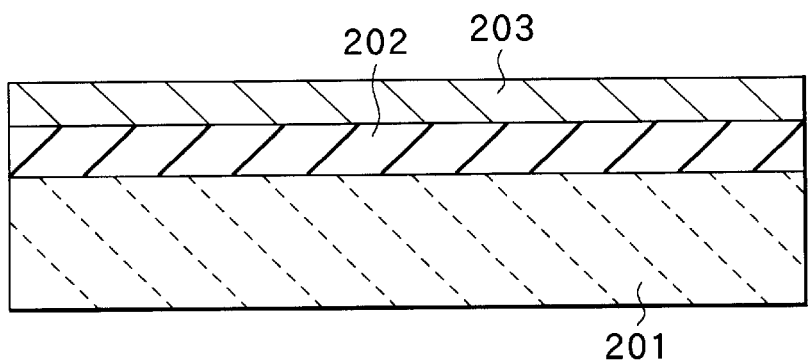 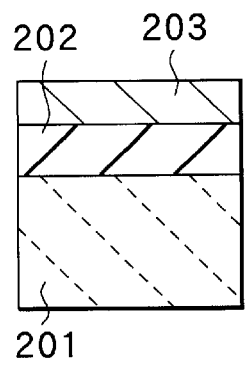
FIG.26A  FIG.26B
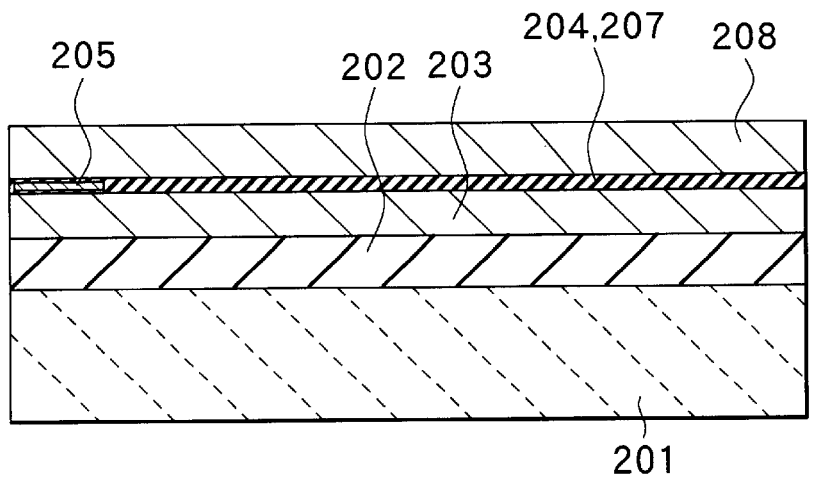 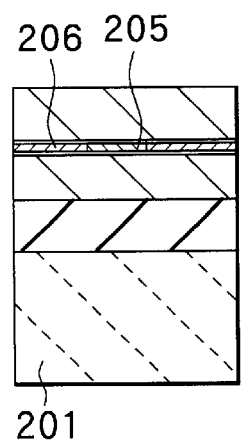
FIG.27A  FIG.27B
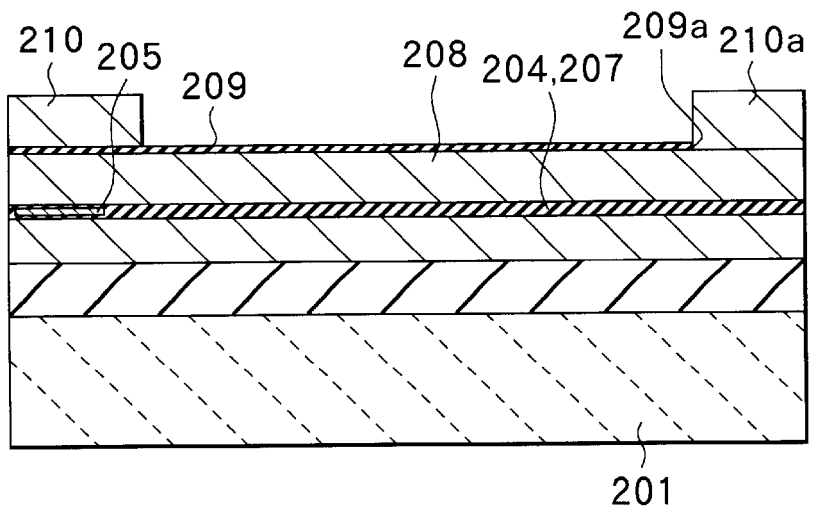 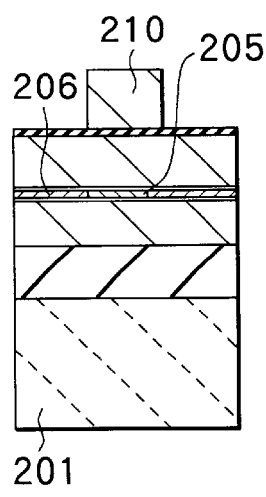
FIG.28A  FIG.28B

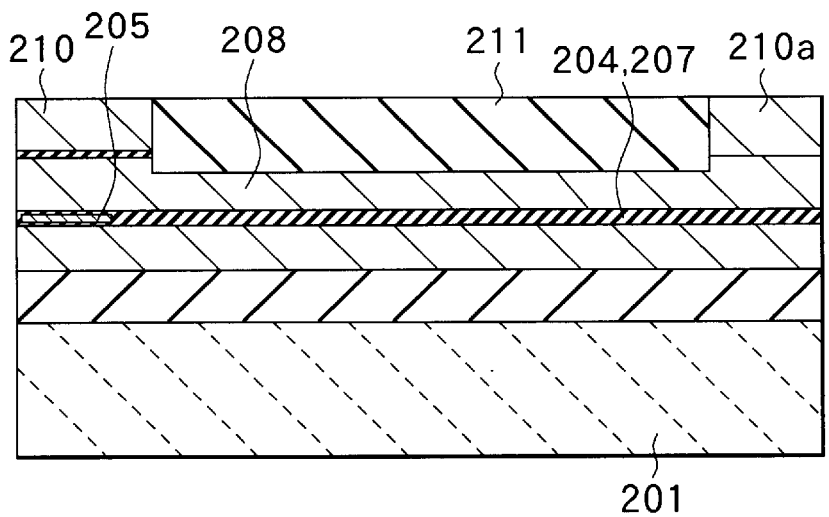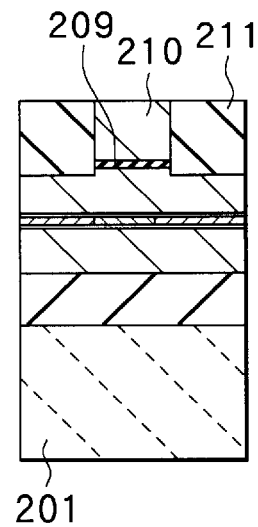
FIG.29A  FIG.29B
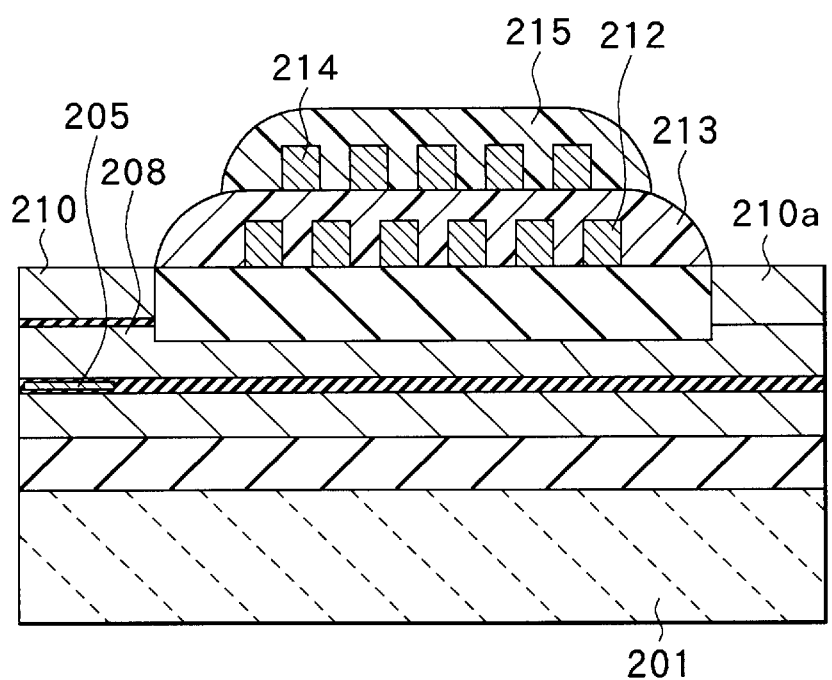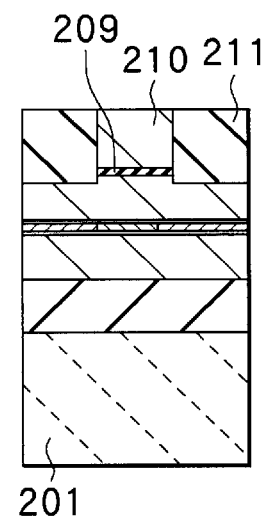
FIG.30A  FIG.30B

THIN FILM MANGETIC HEAD AND METHOD OF MANUFACTURING SAME

BACKGROUND OF THE INVENTION

1. Field of the Invention

The present invention relates to a thin film magnetic head having at least an inductive-type magnetic transducer for writing and to a method of manufacturing the same.

2. Description of the Related Art

Recently, an improvement in performance of thin film magnetic heads has been sought in accordance with an increase in a surface recording density of a hard disk drive. A composite thin film magnetic head, which has a stacked structure of a recording head having an inductive-type magnetic transducer for writing and a reproducing head having a magnetoresistive effect element (hereinafter referred to as an MR element) for reading-out, is widely used as the thin film magnetic head. MR elements include an AMR element using a magnetic film exhibiting an anisotropic magnetoresistive effect (hereinafter referred to as an AMR effect) and a GMR element using a magnetic film exhibiting a giant magnetoresistive effect (hereinafter referred to as a GMR effect). The reproducing head using the AMR element is called an AMR head or simply an MR head, and the reproducing head using the GMR element is called a GMR head. The AMR head is used as the reproducing head whose surface recording density exceeds 1 gigabit per square inch, and the GMR head is used as the reproducing head whose surface recording density exceeds 3 gigabits per square inch.

In general, an AMR film is made of a magnetic substance that exhibits the MR effect and has a single-layered structure. In contrast, many of the GMR films have a multi-layered structure consisting of a plurality of films. There are several types of producing mechanisms of the GMR effect. The layer structure of the GMR film depends on the mechanism. A super lattice GMR film, a spin valve film, a granular m and the like are proposed as the GMR film. Of these types of films, the spin valve film is most efficient as the GMR film which is relatively simple in structure, exhibits a great change in resistance in a low magnetic field, and is suitable for mass-production.

A pattern width, especially an MR height is a primary factor for determining the performance of a reproducing head. The MR height is the length (height) between the end of the MR element closer to an air bearing surface and the other end. The MR height is originally controlled by the amount of polishing during the process of the air bearing surface. The air bearing surface (ABS) is a surface of a thin film magnetic head facing a magnetic recording medium and is also called a track surface.

An improvement in performance of a recording head has also been expected in accordance with the improvement in performance of a reproducing head. It is necessary to increase the track density of the magnetic recording medium in order to increase the recording density among the performance of the recording head. In order to achieve this, it is necessary to develop the recording head with a narrow track structure, the width of a bottom magnetic pole (bottom pole) and a top magnetic pole (top pole) sandwiching a write gap on the air bearing surface being reduced to the order of several microns to submicron. The semiconductor process technique is used to achieve the narrow track structure.

The throat height (TH) is another factor for determining the performance of the recording head. The throat height is the length (height) between the air bearing surface and an edge of an insulating layer (magnetic pole portion) which electrically isolates the thin film coil. Reducing the throat height is desired in order to improve the performance of the recording head. The throat height is also controlled by the amount of polishing during the process of the air bearing surface.

In order to improve the performance of the thin film magnetic head, it is important to form the recording head and the reproducing head in well balance.

An example of a method of manufacturing a composite thin film magnetic head will be described with reference to FIGS. 26A and 26B through FIGS. 31A and 31B as an example of a thin film magnetic head of the related art.

As shown in FIGS. 26A and 26B, an insulating layer 202 made of, for example, alumina (aluminum oxide, $Al_2O_3$) is formed with about 5 to 10 μm thick on a substrate 201 made of, for example, altic ($Al_2O_3$. TiC). Subsequently, a bottom shield layer 203 for the reproducing head made of, for example, permalloy (NiFe) is formed on the insulating layer 202.

As shown in FIGS. 27A and 27B, for example, alumina of about 100–200 nm in thickness is deposited on the bottom shield layer 203 to form a shield gap film 204. An MR film 205 of tens of nanometers in thickness for making up the MR element for reproducing is formed on the shield gap film 204, and high-precision photolithography is applied to obtain a desired shape. A lead terminal layer 206 for the MR film 205 is formed by lift-off. A shield gap film 207 is formed on the shield gap film 204, the MR film 205 and the lead terminal layer 206, and the MR film 205 and the lead terminal layer 206 are buried in the shield gap films 204 and 207. A top shield-cum-bottom pole (hereinafter referred to as a bottom pole) 208 of about 3 μm in film thickness made of a magnetic material used for both the reproducing head and the recording head such as permalloy (NiFe) is formed on the shield gap film 207.

As shown in FIGS. 28A and 28B, a write gap layer 209 of about 200 nm in film thickness made of an insulating layer such as an alumina film is formed on the bottom pole 208. Further, an opening 209a for connecting the top pole and the bottom pole is formed through patterning the write gap layer 209 by photolithography. A pole tip 210 is formed of the magnetic materials consisting of permalloy (NiFe) and nitride ferrous (FeN) through plating with a connecting portion pattern 210a for connecting the top pole and the bottom pole. The bottom pole 208 and a top pole layer 216 which will be described hereinafter are connected by the connecting portion pattern 210a and therefore forming a through hole after CMP (Chemical and Mechanical Polishing) process, which will be described later, becomes easier.

As shown in FIGS. 29A and 29B, the write gap layer 209 and the bottom pole 208 are etched about 0.3 to 0.5 μm by ion milling having the pole tip 210 as a mask. By etching to the bottom pole 208, a trim structure is formed. As a result, the widening of effective write track width can be avoided (that is, suppressing the spread of magnetic flux in the bottom pole when data is being written). Subsequently, after an insulating layer 111 with a film thickness of about 3 μm, made of, for example, alumina is formed over the whole surface and then the surface is planarized by CMP.

As shown in FIGS. 30A and 30B, a thin film coil 212 of a first layer for an inductive-type recording head made of, for example, copper (Cu) is selectively formed on the insulating layer 211 by, for example, plating. On the insulating layer 211 and the thin film coil 212, a photoresist film 213 is formed in a desired pattern by high-precision photolithography. A heat treatment of a predetermined temperature is applied to planarize the photoresist film 213 and to insulate between the turns of the thin film coil 212. Similarly, a thin film coil 214 of a second layer and a photoresist film 215 are formed on the photoresist film 213, and the heat treatment of a predetermined temperature is applied to planarize the photoresist film 215 and to insulate between the turns of the thin film coil 214.

As shown in FIGS. 31A and 31B, a top yoke-cum-top pole layer (hereinafter referred to as a top pole layer) 216 made of the magnetic material for recording heads, for example, permalloy is formed on the pole tip 210 and the photoresist films 213 and 215. The top pole layer 216 is in contact with the bottom pole 208 in a rearward position of the thin film coils 212 and 214, and magnetically coupled to the bottom pole 208. On the top pole layer 216, an overcoat layer 217 made of, for example, alumina is formed. At last, a track surface (air bearing surface) 218 for the recording heads and the reproducing heads is formed through processing a slider, and then a thin film magnetic head is completed. In FIGS. 31A and 31B, TH indicates the throat height, MR-H indicates the MR height, and P2W indicates the track (magnetic pole) width.

An apex angle indicated with θ in FIG. 31A is a factor for determining the performance of the thin film magnetic head besides the throat height TH, the MR height MR-H, and so on. The apex angle is an angle between the straight line connecting the corners of sides on the track surface sides of the photoresist films 213 and 215, and the top surface of the top pole layer 216.

In order to improve the performance of the thin film magnetic head, it is important to form the throat height TH, the MR height MR-H, the apex angle θ and the track width P2W shown in FIG. 31A, precisely.

Especially in recent years, the track width PW2 with submicron dimension equal to or less than 1.0 μm is required to enable high surface density recording, that is, to form a narrow track structured recording head. Therefore, a technique of processing the top pole to submicron dimension using a semiconductor processing technique is required. Also, the magnetic pole using the magnetic materials having higher saturation magnetic flux density is desired in accordance with being the narrow track structure.

The problem is that it is difficult to scale down the top pole layer 216 formed on a coil area (apex area) being protruded like a mountain covered with the photoresist films (for example, the photoresist films 213 and 215 shown in FIG. 31A.)

As a method of forming the top pole, the frame plating, as disclosed in, for example, Japanese Patent Application laid-open in Hei 7-262519, is used. When the top pole is formed by the frame plating, first, a thin electrode film made of, for example, permalloy is formed all over the apex area. Secondly, a photoresist is applied on the apex area, and by patterning it through photolithography, a frame for plating is formed. At last, the top pole is formed through plating using the electrode film formed earlier as a seed layer.

The apex area has differences in height, for example, equal to or more than 7 to 10 μm. If the film thickness of the photoresist formed on the apex area is required at least 3 μm, a photoresist film of equal to or more than 8 to 10 μm in thickness is formed in the lower part of the apex area since the photoresist with liquidity gathers into a lower area. In order to form a narrow track as described, a pattern with submicron width is required to be formed with a photoresist film. Accordingly, it is necessary to scale down the pattern with submicron width with a photoresist film of equal to or more than 8 to 10 μm in thickness, however, it has been extremely difficult.

Moreover, during an exposure of photolithography, a light for the exposure reflects by the electrode film made of, for example, permaloy, and the photoresist is also exposed by the reflecting light causing deformation of the photoresist pattern and so on. As a result, the side walls of the top pole take a rounded shape and so on, and the top pole can not be formed in a desired shape. As described, with a related art, it has been extremely difficult to precisely control the track P2W and to form the top pole precisely so as to have the narrow track structure.

As shown in the steps in FIGS. 28A and 28B through 31A and 31B, a method of connecting the pole tip 210 and the yoke-cum-top pole layer 216 after forming a track width of equal to or less than 1.0 μm in the pole tip 210 which is effective for forming the narrow track of the recording head. Namely, a method of dividing the regular top pole into the pole tip 210 for determining the track width and the top pole layer 116 which becomes the yoke area for inducing magnetic flux is employed (Ref. Japanese Patent Application laid-open Sho 62-245509, and Sho 60-10409). By dividing the top pole into two as described, microfabrication of one of the pole tip 210 on a flat surface of the write gap layer 209 is possible with sub micron width.

How ever, the problems as follows regarding the thin film magnetic head have still existed.

(1) First, in the magnetic head of the related art, the throat height is determined in the end of a further side from the track surface 218 of the pole tip 210. If the width of the pole tip 210 becomes narrower, the pattern edge is formed in a rounded shape by photolithography. Therefore, the throat height, which is required to have a highly precise dimension, is not formed to be uniform. As a result, the track width of the magnetoresistive element unbalanced in the steps of processing and polishing of the track surface. If the track width of 0.5 to 0.6 μm is required, for example, the end of a further side from the track surface 218 of the pole tip 210 shifts from the throat height zero position to the track surface side and writing gap is widely opened. This causes the problem that the recording data cannot be written.

(2) As described above, in the magnetic head of the related art, it is not necessary to scale down the top pole layer 216 as minute as the pole tip 210, because the track width of the recording head is determined by the pole tip 210 which is one of the top pole being divided into two. However, since the position of the top pole layer 216 is determined in the upper area of the pole tip 210 by positioning of photolithography, if both the top pole layer 216 and the pole tip 210 are largely shifted to one side when viewed from the track surface 218 (FIG. 31A) side, so-called side write for performing the writing on the top pole layer 216 side occurs. As a result, the effective track width is widened and the data is written in a region other than the original data recording region in a hard disk.

Further, if the track width of the recording head is extremely scaled down, especially equal to or less than 0.5 μm, the precise process in submicron width is required for the top pole layer 216. If the difference in width of the pole tip 210 and the top pole layer 216 is too significant in the lateral direction viewed from the track surface 218 (FIG. 31A) side, the side write occurs, as described above. This causes the problem that the data is written in a region other than the original data recording region in the hard disk.

Accordingly, the pole tip 210 as well as the top pole layer 216 are required to be processed in the submicron width. However, microfabrication of the top pole layer 116 is difficult because of the significant difference in height in the apex area under the top pole layer 216 as described above.

(3) Moreover, it is difficult for the magnetic head of the related art to shorten a yoke length. The narrower the coil pitch becomes, the easier the achievement of a head with short yoke length becomes and, especially, the recording head with a high frequency characteristics can be formed. However, when the coil pitch is made smaller and smaller, the distance from the throat height zero position to the outer circumferential end of the coil becomes a main factor for preventing the yoke length from shortening. The two-layered coil can shorten the yoke length than the one-layered coil so that many of the recording heads for high frequency employ the two-layered coil. However, in the magnetic head of the related art, after forming a first layer of the coil, a photoresist film of about 2 $\mu$m thick is formed in order to form an insulating layer between the turns of the coil. Therefore, a small apex area having the rounded shape is formed in the outer circumferential end of the first layer of the coil. Next, a second layer of the coil is formed thereon. In this time, the seed layer for forming the second layer of the coil can not be etched in the slope of the apex area result in short-circuit of the coil, which makes it impossible to form the second layer of the coil. Accordingly, the second layer of the coil is required to be formed on a flat area. When the slope of the apex area is 45 to 55°, if a thickness of the coil is 2 to 3 $\mu$m and a thickness of the insulating film between the turns of the coil is 2 $\mu$m, the distance from the outer circumferential end of the coil to the vicinity of the throat height zero position is required to be 8 to 10 $\mu$m which is twice of 4 to 5 $\mu$m, (the distance from the contact area of the top pole and the bottom pole to the outer circumferential end of the coil is also required to be 4 to 5 $\mu$m). This has been the main factor for preventing the yoke length from shortening. For instance, when forming the 11 turns-two-layered coil with line/space being 1.0 $\mu$m/1.0 $\mu$m, suppose the first layer is 6 turns and the second layer is 5 turns, then the length of the coil of the yoke length is 11 $\mu$m. In this case, since the distance of 8 to 10 $\mu$m is required in the apex area of the outer circumferential end, shortening of the yoke length of equal to less than 19 to 21 $\mu$m is impossible. This has prevented the high frequency characteristics from improving.

The applicant has proposed the thin film magnetic head which can precisely control the throat height of the recording head and enable the super-microfabrication of the top pole layer and the pole tip in submicron width and further shortened the yoke length of the recording head (Japanese Patent Application laid-open Hei 7-243942). In this magnetic head, the bottom pole is also divided into a flat bottom pole layer (bottom pole) and a bottom pole tip like the top pole. The bottom pole tip is formed being protruded shape against the bottom pole layer and the insulating layer made of inorganic materials is formed adjacent to the bottom pole tip. This magnetic head allows to determine the throat height precisely by making the length from the surface of the bottom pole tip facing the recording medium to the inner direction equal to the length of the throat height of the recording head.

SUMMARY OF THE INVENTION

The object of the invention is to provide a preferred method of manufacturing the thin magnetic head which is easy to manufacture the thin magnetic head proposed in above mentioned application, that is, the thin magnetic head having the structure that the magnetic pole and the insulating layer lie contiguously and determine the throat height of the recording head precisely.

The another object of the invention is to provide the thin magnetic head which enable the shortening of the yoke length of the recording head.

A method of manufacturing the thin film magnetic head of the invention having at least two magnetic layers including two magnetic poles being magnetically coupled to each other, part of sides of which facing the recording medium face each other sandwiching a write gap layer, and one or more than two layers of the thin film coil for generating magnetic flux, include the steps of: selectively forming the insulating layers having a reversed pattern shape to the magnetic pole on the magnetic layer after forming the planarized magnetic layer; and forming the magnetic pole magnetically coupled to part of the magnetic layer by using the pattern of the insulating layer.

Specifically, the insulating layer having the reversed pattern shape to the magnetic pole is selectively formed on the magnetic layer and the magnetic material is deposited on the insulating layer and the magnetic layer, and then the magnetic pole which is magnetically coupled to part of the magnetic layer is formed by planarization being the same height as the surface of the insulating layer.

In the method of manufacturing the thin film magnetic head, a magnetic pole is formed to be adjacent to the insulating layer by planarizing the magnetic layer using the insulating layer formed earlier. As a result, the throat height of the recording head is determined precisely by making the distance of the end surface of the insulating layer from the surface of the magnetic pole facing the recording medium (that is, the length from the surface of the magnetic pole facing the recording medium to the inner direction) is equal to the length of the throat height of the recording head.

Another method of manufacturing the thin film magnetic head of the invention having at least two magnetic layers including two magnetic poles being magnetically coupled to each other, part of sides of which facing the recording medium face each other sandwiching the write gap layer, and one or more than two layers of the thin film coil for generating magnetic flux, includes the steps of: forming a first insulating layer on the magnetic layer after planarizing the magnetic layer; forming a thin film coil on the first insulating layer and then forming a second insulating layer to cover the thin film coil; patterning the first and the second insulating layers to be the reversed pattern shape to the magnetic pole; and forming a magnetic pole to be magnetically coupled to part of the magnetic layer by using the patterns of the first and the second insulating layers.

Specifically, the magnetic pole which is magnetically coupled to part of the magnetic layer is formed by planarization being the same height as a surface of the second insulating layer after patterning the first and the second insulating layers and depositing the magnetic material on the magnetic layer and the second insulating layer.

Also in the method of manufacturing the thin film magnetic head, the magnetic pole is formed to be adjacent to the insulating layer by planarizing the magnetic layer using the first and the second insulating layers patterned earlier. As a result, the throat height of the recording head is determined precisely by making the distance of the end surfaces of the first and the second insulating layers from the surface of the magnetic pole facing the recording medium (that is, the length from the surface of the pole tip facing the recording medium to the inner direction) is equal to the length of the throat height of the recording head.

A thin film magnetic head of the invention comprises two magnetic layers, each of which has at least one or more layers, including two magnetic poles being magnetically coupled to each other, part of sides of which facing the recording medium face each other sandwiching the write gap layer, and a inductive-type magnetic transducer having the thin film coil disposed between the magnetic layers with insulated, wherein the one magnetic layer has a first portion located in the region including the interior region face to the whole thin film coil, a second portion forming the magnetic pole and being connected to the first portion, and a third portion for connecting the first portion and the other magnetic layer; and at least part of the thin film coil is located to face to the first portion and to pass through between the second and the third portions.

In the thin film magnetic head of the invention, the second portion of one magnetic layer may determines the throat height.

In the thin film magnetic head of the invention, the other magnetic layer may have a first portion located in the region including the interior region face to the thin film coil, a second portion forming the magnetic pole and being connected to the first portion, and a third portion for connecting the first portion and one magnetic layer.

In the thin film magnetic head of the invention, the end surface of the first portion of the other magnetic layer facing the recording medium may be located far from the surface facing the recording medium of the thin film magnetic head.

In the thin film magnetic head of the invention, the length of the second portion of the other magnetic layer may be equal to or more than twice as the length of the second portion of one magnetic layer.

In the thin film magnetic head of the invention, the thin film coil may have a first layer located to pass through between the second and the third portions of one magnetic layer, and a second layer located to pass thorough between the second and the third portions of the other magnetic layer.

In the thin film magnetic head of the invention may comprises: a magnetic transducer; and a first and a second shield layers for shielding the magnetic transducer located to be face each part of the sides of the shield layers facing the recording medium sandwiching the magnetic transducer. In this case, the second shield layer also may serves as one magnetic layer.

Other and further objects, features and advantages of the invention will appear more fully from the following description.

BRIEF DESCRIPTION OF THE DRAWINGS

FIGS. 1A and 1B are cross sections for describing a process of manufacturing the thin film magnetic head according to a first embodiment of the invention;

FIGS. 2A and 2B are cross sections for describing the following step shown in FIGS. 1A and 1B;

FIGS. 3A and 3B are cross sections for describing the following step shown in FIGS. 2A and 2B;

FIGS. 4A and 413 are cross sections for describing the following step shown in FIGS. 3A and 3B;

FIGS. 16A and 16B are cross sections for describing a process of manufacturing the thin film magnetic head according to a fourth embodiment of the invention;

FIGS. 17A and 17B are cross sections for describing the following step shown in FIGS. 16A and 16B;

FIGS. 18A and 18B are cross sections for describing the following step shown in FIGS. 17A and 17B;

FIGS. 19A and 19B are cross sections for describing the following step shown in FIGS. 18A and 18B;

FIGS. 20A and 20B are cross sections for describing the following step shown in FIGS. 19A and 19B;

FIGS. 26A and 26B are cross sections for describing a process of manufacturing the thin film magnetic head of the related art;

FIGS. 27A and 27B are cross sections for describing the following step shown in FIGS. 26A and 26B;

FIGS. 28A and 28B are cross sections for describing the following step shown in FIGS. 27A and 27B;

FIGS. 29A and 29B are cross sections for describing the following step shown in FIGS. 28A and 28B;

FIGS. 30A and 30B are cross sections for describing the following step shown in FIGS. 29A and 29B.

DETAILED DESCRIPTION OF THE PREFERRED EMBODIMENTS

Figures 4A, 4B:
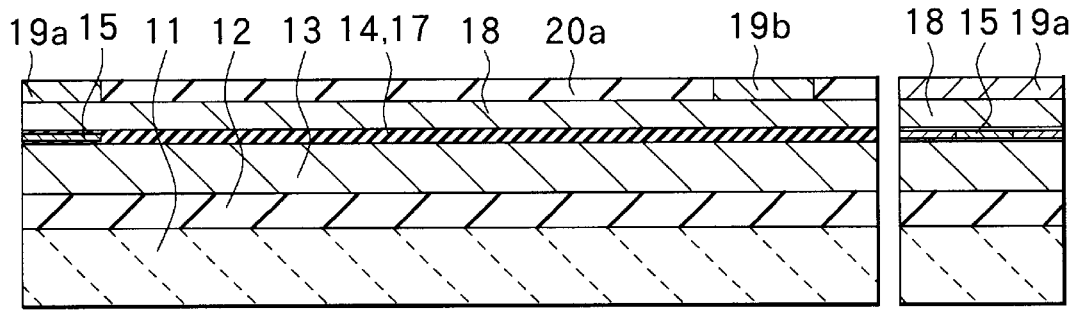

Embodiments of the invention will be described in detail with reference to the drawings in the followings.

[First Embodiment]

FIGS. 1A and 1B through FIGS. 7A and 7B illustrate a manufacturing process of a composite thin film magnetic head as a thin film magnetic head according to a first embodiment of the invention, respectively. FIGS. 1A to 7A show the cross sections vertical to the track surface (ABS), and FIGS. 1B to 7B show the cross sections parallel to the track surface of the magnetic pole.

In the embodiment, first, as shown in FIGS. 1A and 1B, an insulating layer 12, made of, for example, alumina ($Al_2O_3$) is formed with about 3 to 5 $\mu$m in thickness on a substrate 11 made of, for example, altic ($Al_2O_3$. TiC) by, for example, sputtering. On the insulating layer 12, a bottom shield layer 13 for the reproducing head is formed by selectively forming permalloy (NiFe) with about 3 $\mu$m in thickness by plating using a photoresist film as a mask. Subsequently, an alumina film (not shown) of about 4 to 6 $\mu$m in thickness is formed by, for example, sputtering or CVD (Chemical Vapor Deposition) and is planarized by CMP.

As shown in FIGS. 2A and 2B, a shield gap layer 14 is formed by depositing, for example, alumina of about 100 to 200 nm in thickness on the bottom shield layer 13 by sputtering. On the shield gap layer 14, a GMR film 15 for forming such as the GMR element for reproducing is formed in tens of nanometers in thickness, and a desired shape is obtained by high-precision photolithography. The GMR film 15 is formed of the materials having the magnetoresistive effect such as free layer made of, for example, permalloy (NiFe), antiferromagnetic layer made of PtMn, IrMn and RuRhMn, or the like. The other magnetoresistive film such as the AMR film could be used to form the GMR element or the like for reproducing instead of the GMR film 15. Subsequently, a lead terminal layer 15a for the GMR film 15 is formed by lift-off. On the shield gap layer 14, the GMR film 15 and the lead terminal layer 15a, a shield gap layer 17 is formed, and the GMR film 15 and the lead terminal layer 15a are buried in the shield gap layers 14 and 17.

A top shield-cum-bottom pole layer (bottom pole) 18, made of, for example, permalloy (NiFe) is formed in a thickness of about 1.0 to 1.5 $\mu$m on the shield gap layer 17.

As shown in FIGS. 3A and 3B, an insulating layer 20a having a opening corresponding to a bottom pole tip 19a and a bottom connecting portion 19b described hereinafter is formed on the bottom pole layer 18. The insulating layer 20a is formed of the insulating material such as alumina by, for example, sputtering or CVD. The thickness of the insulating layer 20a is, for example, about 2.0 to 2.5 $\mu$m to the bottom pole top 19a described hereinafter. A magetic layer 19 is formed on the insulating layer 20a and the bottom pole layer 18. The magnetic layer 19 may be formed of plating films such as NiFe as well as sputter films such as FeN, FeZrNP, CoFeN, or the like. The tip of the insulating layer 20a on the track side is positioned at the throat height zero position. The insulating layer 20a corresponds to the insulating layer of the invention.

As shown in FIGS. 4A and 4B, after planarizing the magnetic layer 19 by CMP (Chemical and Mechanical Polishing), the surface of the insulating layer 20a is exposed. By this step, the bottom pole tip 19a and the bottom connecting portion 19b of about 2.0 to 2.5 $\mu$m in thickness are formed adjacent to the insulating layer 20a, respectively on the bottom pole layer 18. The bottom pole layer 18 corresponds to the one magnetic layer and the bottom pole tip 19a corresponds to the magnetic pole of the one magnetic layer of the invention.

Figures 5A, 5B:
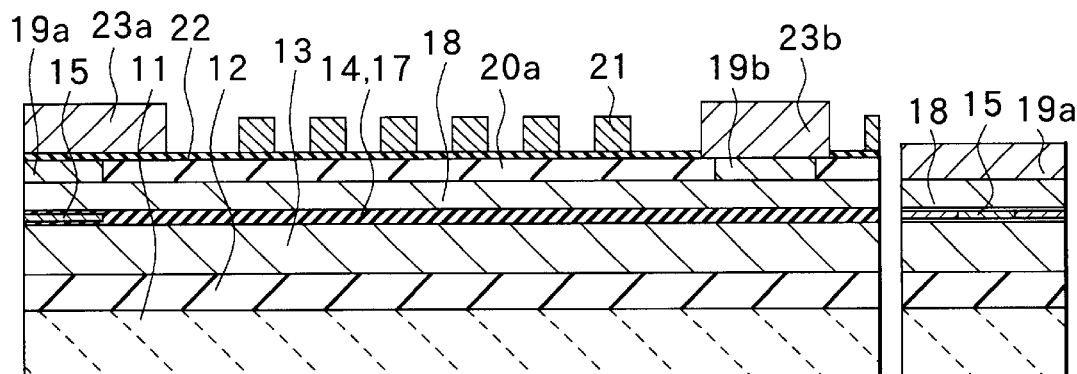
FIGS. 5A and 5B are cross sections for describing the following step shown in FIGS. 4A and 4B.

As shown in FIGS. 5A and 5B, a write gap layer 22 0.2 to 0.3 $\mu$m in film-thickness made of the insulating material such as alumina is formed by sputtering. The write gap layer 22 may be formed of materials such as aluminum nitride (ALN), silicon oxide, silicon nitride and so on, besides alumina. Subsequently, an opening for connecting the top pole and the bottom pole is formed by patterning the write gap layer 22 by photolithography.

Further, a top pole tip 23a for determining the track width of the recording head is formed on the write gap layer 22 by photolithography. That is, a magnetic layer of about 2.5 to 3.5 $\mu$m in film-thickness made of the high saturated flux density material (Hi-Bs materials), for example, NiFe (Ni: 50% by weight, Fe: 50% by weight), NiFe (Ni: 80% by weight, Fe: 20% by weight), FeN, FeZrNP, CoFeN and so on is formed on the write gap layer 22 by, for example, sputtering. Subsequently, the top pole tip 23a is formed by selectively removing the magnetic layer by, for example, ion milling with, for example, Ar (argon) using the photoresist mask, and a top connecting portion 23b for magnetically coupling the top pole and the bottom pole is formed. The top pole tip 23a and the top connecting portion 23b may be formed by using a mask made of an inorganic insulating layer such as alumina, instead of the photoresist mask as well as by plating, sputtering or the like, other than the photolithography. The pole tip 23a corresponds to the magnetic pole of the other magnetic layer of the invention.

In the embodiment, the top pole tip 23a is formed to be longer than the bottom pole tip 19a from the track surface to the inner direction. The top connecting portion 23b is formed to be wider than the bottom connecting portion 19b so that the bottom connecting portion 19b is centered in and is in contact with the top connecting portion 23b.

In the concave region formed between the bottom pole tip 19a and the bottom connecting portion 19b, a thin film coil 21 of a first layer for conductive-type recording head made of, for example, copper (Cu) is formed with a thickness of 1.5 to 2.5 $\mu$m by, for example, electroplating.

Figures 6A, 6B:
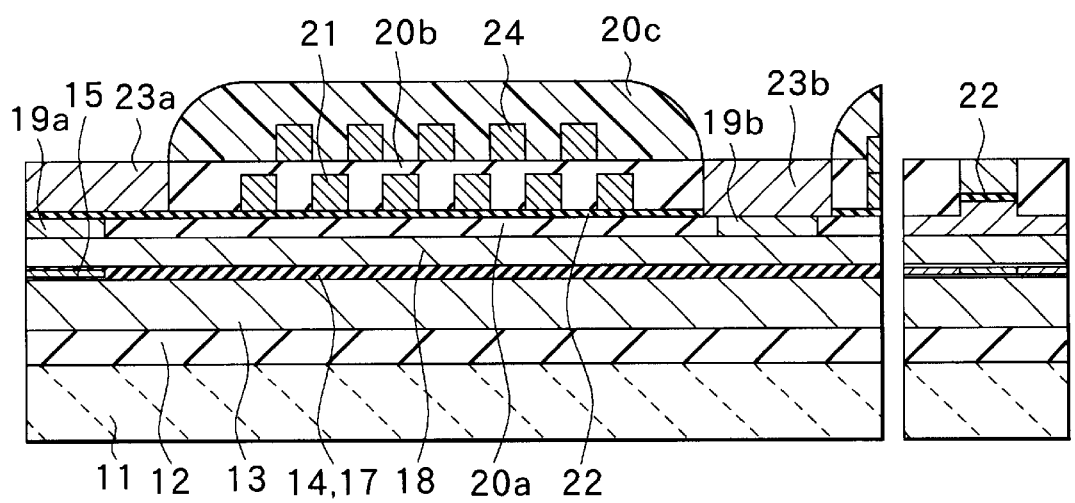
FIGS. 6A and 6B are cross sections for describing the following step shown in FIGS. 5A and 5B.

As shown in FIGS. 6A and 6B, an insulating layer 20b of about 3.0 to 4.0 $\mu$m in film-thickness made of the insulating material such as alumina is formed all over the surface of the substrate 11 by sputtering. After that, the surface of the insulating layer 20b is planarized by, for example, CMP so as to expose the surface of the top pole tip 23a and the top connecting portion 23b. The insulating layers 20b and 20a may be formed of other insulating materials such as silicon dioxide ($SiO_2$), silicon nitride (SiN) and so on besides alumina.

Using the top pole tip 23a as a mask, the write gap layer 22 and the bottom pole tip 19a on the periphery of the top pole tip 23a are etched in a self-aligned manner. That is, a trim structured recording track is formed by further etching the exposed bottom pole tip 19a in the order of 0.3 to 0.6 $\mu$m in deep by ion-milling with Ar after selectively removing the write gap layer 22 by RIE (Reactive Ion Etching) with chlorine gas ($Cl_2$, $CF_4$, $BCl_2$, $SF_6$ and so on).

On the insulating layer 20b, a thin film coil 24 of the second layer for the inductive-type recording head made of, for example, copper (Cu) is selectively formed by, for example plating. On the insulating layer 20b and the thin film coil 24, a photoresist film 20c is formed in predetermined pattern by high-precision photolithography. The heat treatment is applied to planarize the photoresist film 20c and to insulate between the turns of the thin film coil 24.

Figures 7A, 7B:
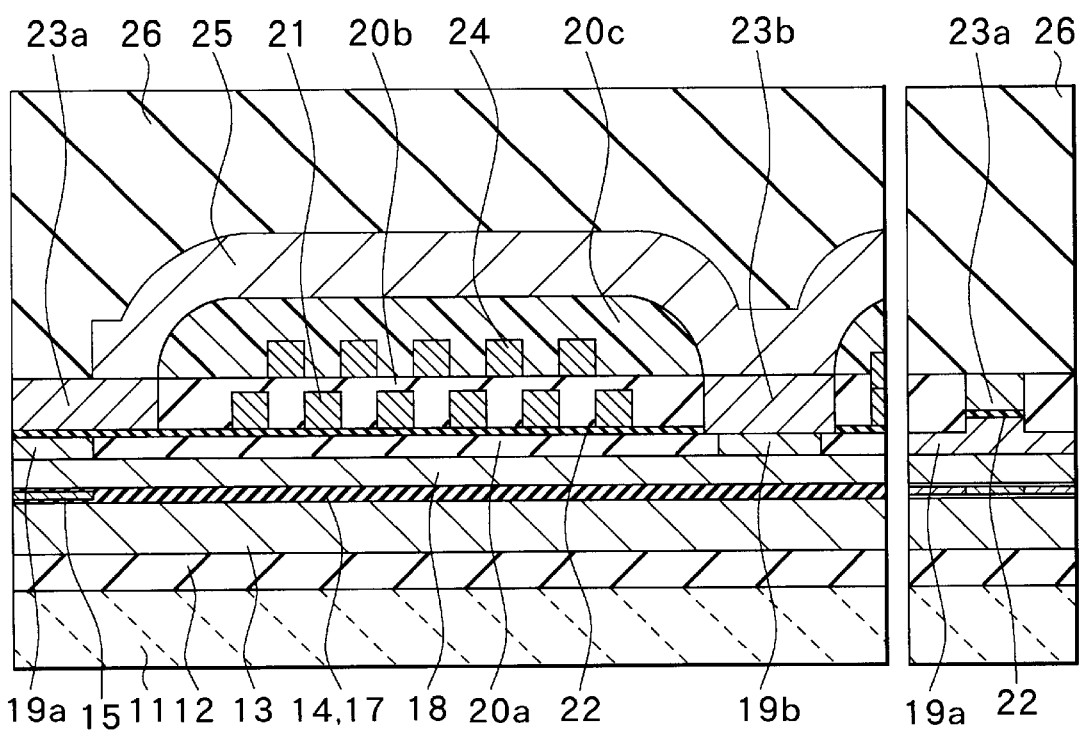
FIGS. 7A and 7B are cross sections for describing the following step shown in FIGS. 6A and 6B.

As shown in FIGS. 7A and 7B, a top pole layer 25 is formed in a thickness of about 3 to 4 $\mu$m using, for example, the same material as the top pole tip 23a by, for example, electroplating or sputtering. The top pole layer 25 has a contact with the bottom connecting portion 19b sandwiching the top connecting portion 23b in a rearward position of the thin film coils 21 and 24 viewed from the track surface side, and is magnetically coupled to the bottom pole layer 18. At last, an overcoat layer 26 of about 30 µm in film-thickness, made of alumina is formed on the top pole layer 25 by, for example, sputtering. After that, the thin magnetic head is completed by processing the slider and by forming the track surface (ABS) of the recording and the reproducing heads. The top pole layer 25 corresponds to the other magnetic layer of the invention.

Figure 8:
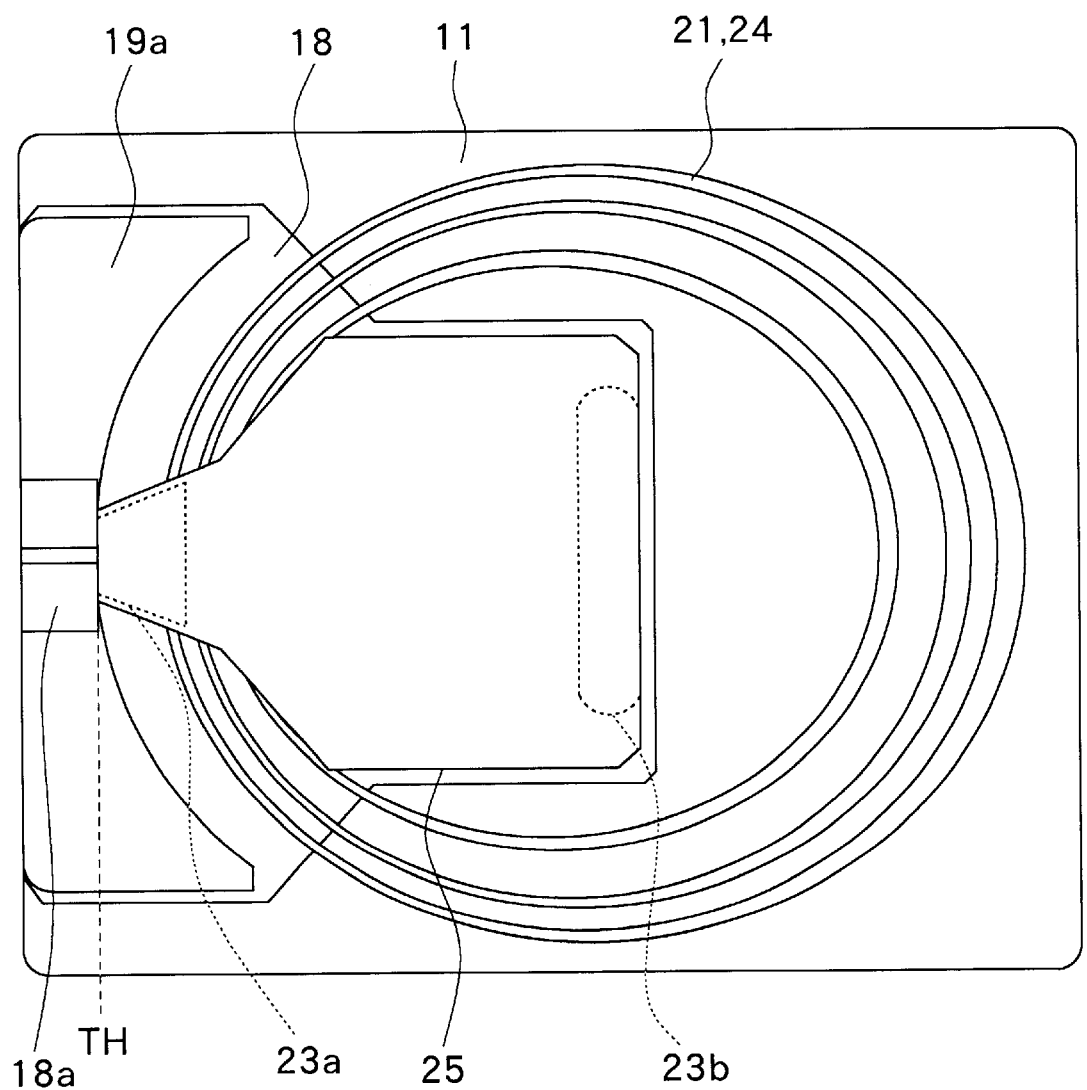
FIG. 8 is a plan view of a main part of the thin film magnetic head manufactured according to a first embodiment of the invention.

FIG. 8 is a plan view of the thin film magnetic head according to the embodiment of the invention. The figure shows a state before processing the slider. In the figure, TH indicates the throat height, and the throat height TH is determined by the end of the insulating layer 20a of the magnetic pole side, that is, by the end of the bottom pole tip 19a on the opposite side of the track surface. Since the throat height TH coincide with the GMR height, TH equals to GMR height (TH=GMR height).

With the embodiment described above, effects described in the followings can be obtained.

(1) In the embodiment, the bottom pole is divided into the bottom pole tip 19a and the bottom pole layer 18, and the planarizing process is performed by using the insulating layer 20a after forming the insulating layer 20a made of the inorganic materials on the bottom pole layer 18. This enables the bottom pole tip 19a to be formed adjacent to the insulating layer 20a. Accordingly, the throat height is determined by the end of the insulating layer 20a on the bottom pole tip 19a side (that is, the end of the bottom pole tip 19a on the opposite side of the track surface). It is therefore possible to precisely control the throat height of the recording head without occurring a pattern shift of the end by heat treatment or profile deterioration, unlike the conventional photoresist film. In addition, the precise control of the GMR height and the apex angle can be achieved as well.

(2) In the embodiment, the top pole tip 23a is formed to be longer than the bottom pole tip 19a. This enables the top pole tip 23a and the top pole layer 25 to increase the contact area and to have a excellent magnetic coupling, compared to the case where the top pole tip 23a is as long as the bottom pole tip 19a Especially, if the top pole layer 25 has a recessed structure in which the top pole layer 25 is provided in a rearward position of the track surface like this embodiment, such a configuration is effective. In other words, if the top pole layer 25 is in the position closer to the track surface than the throat height zero position (the end of the bottom pole tip 19a on the opposite side of the track surface), for example, in the periphery position of the throat height is 0.5 µm, side write, writing information in adjacent track, occurs by the top pole layer 25. Desirably, the top pole layer 25 is formed in further position from the track surface than the throat height zero position. On the other hand, in the embodiment, the bottom pole tip 19a for determining the throat height is magnetically coupled to the top pole layer 25 sandwiching the top pole tip 23a so that it is necessary to connect tightly the top pole tip 23a and the top pole layer 25 in the direction opposite to the track surface from the throat height zero position. It is therefore desirable to form the top pole tip 23a longer than the bottom pole tip 19a.

(3) In the embodiment, as shown in FIG. 8, when each pattern viewed from the right above, the width of the bottom pole tip 19a is made wider than the width of the top pole tip 23a. As a result, even if the top pole tip 23a is a narrow track with half-micron width, the magnetic flux does not saturate in the vicinity of the bottom pole tip 19a.

(4) The top pole tip 23a and the bottom pole tip 19a are scaled down and the narrower the width is, the narrower the width of the contact portions of the top pole and the bottom pole, that is, the bottom connecting portion 19b and the top connecting portion 23b. If the width of the bottom connecting portion 19b and the top connecting portion 23b are scaled down, in the case where the angle of the side walls of the bottom connecting portion 19b against the bottom pole layer 18 or the angle of the side walls of the top connecting portion 23b against the top pole layer 25 is vertical, the magnetic flux might be saturated in the area. On the other hand, in the embodiment, the area of the top connecting portion 23b is larger than that of the bottom connecting portion 19b and the bottom connecting portion 19b is facing the center of the top connecting portion 23b. As a result, when viewed in cross section, the whole contact portion is a shape having the slope along the incline between the top coil and the bottom coil, that is, the whole contact portion becomes like a funnel shape. Therefore, the magnetic flux flow smoothly from the top pole to the bottom poles and the both pole are well magnetically coupled.

(5) In the embodiment, as the insulating film 20a and the write gap layer 22 made of a inorganic material are provided between the thin film coil 21 and the bottom pole layer 18, so that a large dielectric strength can be obtained between the thin film coil 21 and the bottom pole layer 18, respectively by adjusting the thickness of the insulating layer 20a.

(6) In the embodiment, the top pole is divided into the top pole tip 23a and the top pole layer 25, and the top pole tip 23a is formed on a flat surface of the bottom pole tip 19a sandwiching the write gap layer 22. As a result, the top pole tip 23a for controlling the width of the recording track can be formed with high precision in submicron width. In addition, in the embodiment, the thin film coil 21 of the first layer is buried in the concave region adjacent to the top pole tip 23a by the insulating layer 20b, and the surface of the insulating layer 20b is planarized to be the same height as the surface of the top pole tip 23a. That is, the steps in the apex area including the thin film coil 24 of the second layer is decreased for the height of the thin film coil 21 compared to the configuration of the related art. Accordingly, when forming the top pole layer 25 which has a contact with the top pole tip 23a partially by photolithography, the differences in thickness of the photoresist films in the top and the bottom of the apex area is decreased. As a result, the top pole layer 25 can be scaled down in the submicron dimension. Therefore, in the thin film magnetic head obtained through the embodiment, the high surface density recording by the recording head can be achieved, and the performance of the recording head can be improved by stacking the coils to two or three layers. When applying photolithography to the top pole tip 23a and the top pole layer 25, the top pole tip 23a and the top pole layer 25 can be scaled down with higher precision by using the inorganic insulating layer as a mask instead of the photoresist. Further, even in the case where the top pole tip 23a and the top pole layer 25 are formed by such as sputtering other than photolithography, similarly, the top pole tip 23a and the top pole layer 25 can be scaled down since the influence of the steps in the apex area is decreased. The protrusion, the top pole (the top pole tip 23a or the top pole layer 25) is expanded by the heat generated on the hard disk at the time of performing and protrudes to the ABS, is substantially suppressed.

(7) In the embodiment, since there is no incline of the photoresist pattern under the thin film coils 21 and 24, unlike the related art, the thin film coils 21 and 24 can be formed on the flat area. Therefore, the distance from the coil outer circumferential end to the throat height zero position by the incline does not prevent the yoke length from shortening.

Accordingly, in the embodiment, the yoke length can be shortened, and the high frequency characteristic of the recording head can be remarkably improved.

(8) In the embodiment, the magnetic layers such as the top pole tip 23a, the top pole layer 25 and so on are formed of the high saturation magnetic flux density (Hi-Bs) materials. Even if the track width becomes narrower, the magnetic flux generated in the thin film coils 21 and 24 does not saturate on the way but effectively reaches to the top pole tip 23a and the bottom pole tip 19a. Thereby, the recording head without a magnetic loss can be achieved.

(9) Moreover, in the embodiment, the top pole layer 25 formed on the top pole tip 23a for determining the track width is not exposed to the track surface, so that the side write by the top pole layer 25 does not occur.

[Second Embodiment]

FIGS. 9A and 9B through FIGS. 14A and 14B illustrate a manufacturing process of a composite thin film magnetic head according to a second embodiment of the invention. The same numerals are given for the same parts of the configuration as those of the first embodiment and the description for them will be omitted.

Figures 9A, 9B:
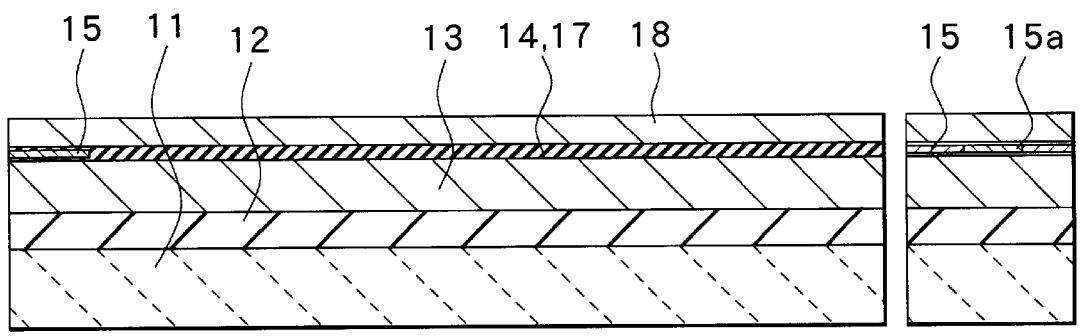
FIGS. 9A and 9B are cross sections for describing a process of manufacturing the thin film magnetic head according to a second embodiment of the invention.

In the embodiment, first, as shown in FIGS. 9A and 9B, the insulating layer 12, made of, for example, alumina ($Al_2O_3$) is formed with about 3 to 5 $\mu$m in thickness on the substrate 11 made of, for example, altic ($Al_2O_3$. TiC) by, for example, sputtering. On the insulating layer 12, the bottom shield layer 13 for the reproducing head is formed by selectively forming permalloy (NiFe) with about 3 $\mu$m in thickness by plating using the photoresist film as a mask. Subsequently, the alumina film (not shown) of about 4 to 6 $\mu$m in thickness is formed by, for example, sputtering or CVD and is planarized by CMP.

Subsequently, the shield gap layer 14 is formed by depositing, for example, alumina of about 100 to 200 nm in thickness on the bottom shield layer 13 by sputtering. On the shield gap layer 14, the GMR film 15 for forming such as the GMR element for reproducing is formed in tens of nanometers in thickness, and a desired shape is obtained by high-precision photolithography. The lead terminal layer 15a for the GMR film 15 is formed by lift-off. On the shield gap layer 14, the GMR film 15 and the lead terminal layer 15a, the shield gap layer 17 is formed, and the GMR film 15 and the lead terminal layer 15a are buried in the shield gap layers 14 and 17. The top shield-cum-bottom pole layer (bottom pole) 18, made of, for example, permalloy (NiFe) is formed in a thickness of about 1.0 to 1.5 $\mu$m on the shield gap layer 17. Up to this process is the same as the first embodiment.

Figures 10A, 10B:
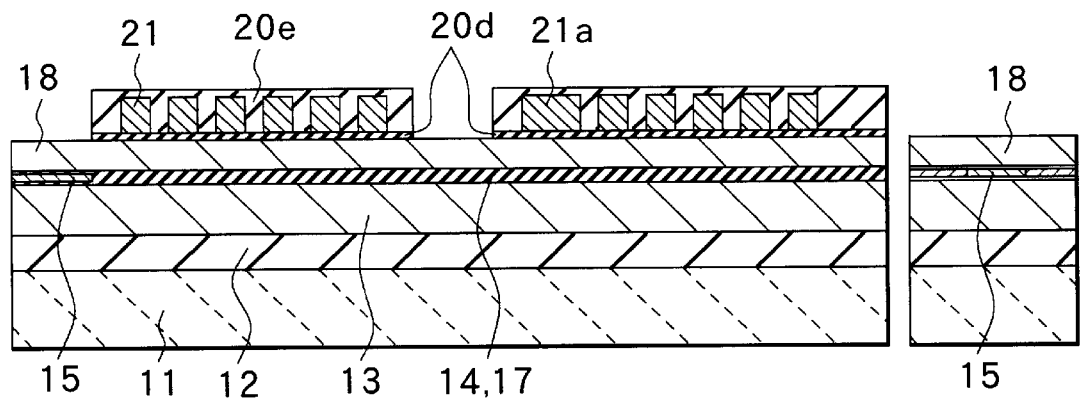
FIGS. 10A and 10B are cross sections for describing the following step shown in FIGS. 9A and 9B.

In the embodiment, as shown in FIGS. 10A and 10B, the insulating layer 20d made of the insulating material such as alumina is formed by, for example, sputtering or CVD. On the insulating layer 20d, the thin film coil 21 of a first layer made of, for example, copper (Cu) is formed with a thickness of 1.5 to 2.5 $\mu$m by, for example, electroplating. The wide connecting portion 21a for connecting to the thin film coil 24 of a second layer is formed on the part of the thin film coil 21. On the thin film coil 21 and the insulating layer 20d, an insulating layer 20e made of the insulating material such as alumina is formed by, for example, sputtering or CVD. The openings corresponding to the bottom pole tip 19a and the bottom connecting portion 19b described hereinafter (FIGS. 12A and 12B) are respectively formed by patterning the insulating layers 22e and 22d by photolithography. Like the first embodiment, the tips of the insulating layers 20d and 20e on the track side are positioned at the throat height zero position. The insulating layer 20d corresponds to a first insulating layer of the invention and the insulating layer 20d corresponds to a second insulating layer.

Figures 11A, 11B:
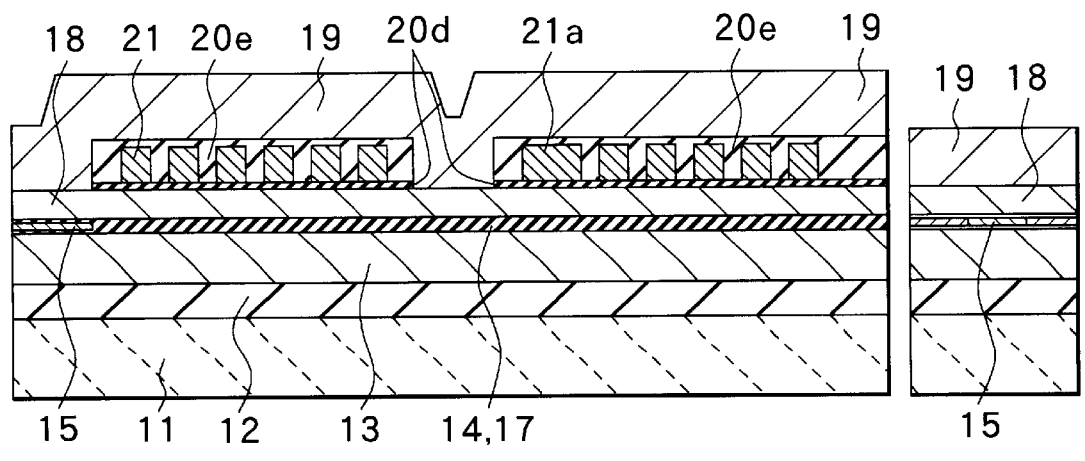
FIGS. 11A and 11B are cross sections for describing following step shown in FIGS. 10A and 10B.

As shown in FIGS. 11A and 11B, the magnetic layer 19 is formed on the insulating layer 20e and the bottom pole layer 18.

Figures 12A, 12B:
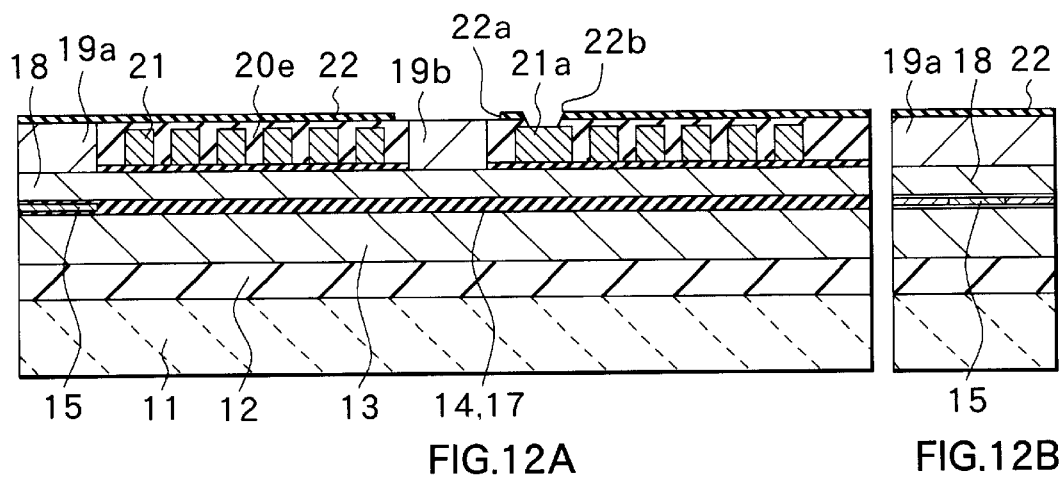
FIGS. 12A and 12B are cross sections for describing following step shown in FIGS. 11A and 11B.

As shown in FIGS. 12A and 12B, the surface of the insulating layer 20e is exposed by planarizing the magnetic layer 19 by, for example, CMP. By this step, the bottom pole tip 19a and the bottom connecting portion 19b are formed on the bottom pole layer 18. The write gap layer 22 of 0.2 to 0.3 $\mu$m in film-thickness made of the insulating material such as alumina is formed by sputtering. The opening 22a for connecting the top pole and the bottom pole is formed by patterning the write gap layer 22 by photolithography and a opening 22b for connecting the turns of the coil facing the connecting portion 21a of the thin film coil 21.

Figures 13A, 13B:
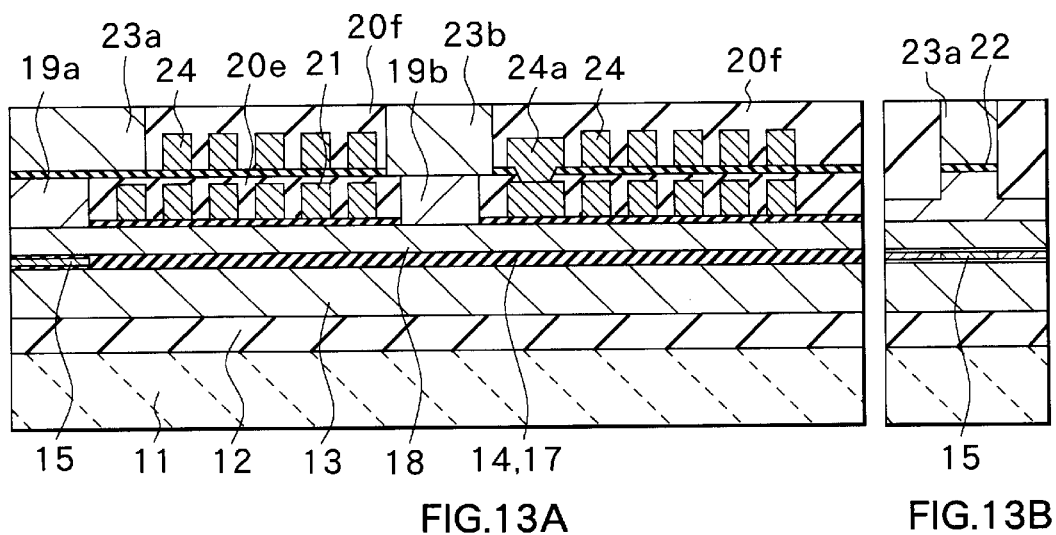
FIGS. 13A and 13B are cross sections for describing the following step shown in FIGS. 12A and 12B.

As shown in FIGS. 13A and 13B, the top pole tip 23a for determining the track width of the recording head and the top connecting portion 23b for magnetically coupling the top pole and the bottom pole are formed on the write gap layer 22. Also in the embodiment, the top pole tip 23a is formed to be longer than the bottom pole tip 19a from the track surface to the inner direction and the top connecting portion 23b is formed to be wider than the bottom connecting portion 19b so that the bottom connecting portion 19b is centered in and is in contact with the top connecting portion 23b.

Subsequently, in the concave region formed between the bottom pole tip 19a and the bottom connecting portion 19b, the thin film coil 24 of a second layer made of, for example, copper (Cu) is formed with a thickness of 1.5 to 2.5 $\mu$m by, for example, electroplating. Part of the thin film coil 24 (the wide connecting portion 24a) is connected to the wide connecting portion 21a of the thin film coil 21 of the first layer.

An insulating layer 20f made of the insulating materials such as alumina is formed all over the surface of the thin film coil 24 by sputtering. After that, the surface of the insulating layer 20f is planarized by, for example, CMP so as to expose the surfaces of the top pole tip 23a and the top connecting portion 23b. Using the top pole tip 23a as a mask, the write gap layer 22 and the bottom pole tip 19a on the periphery of the top pole tip 23a are etched in a self-aligned manner to form the trim structured recording track.

Figures 14A, 14B:
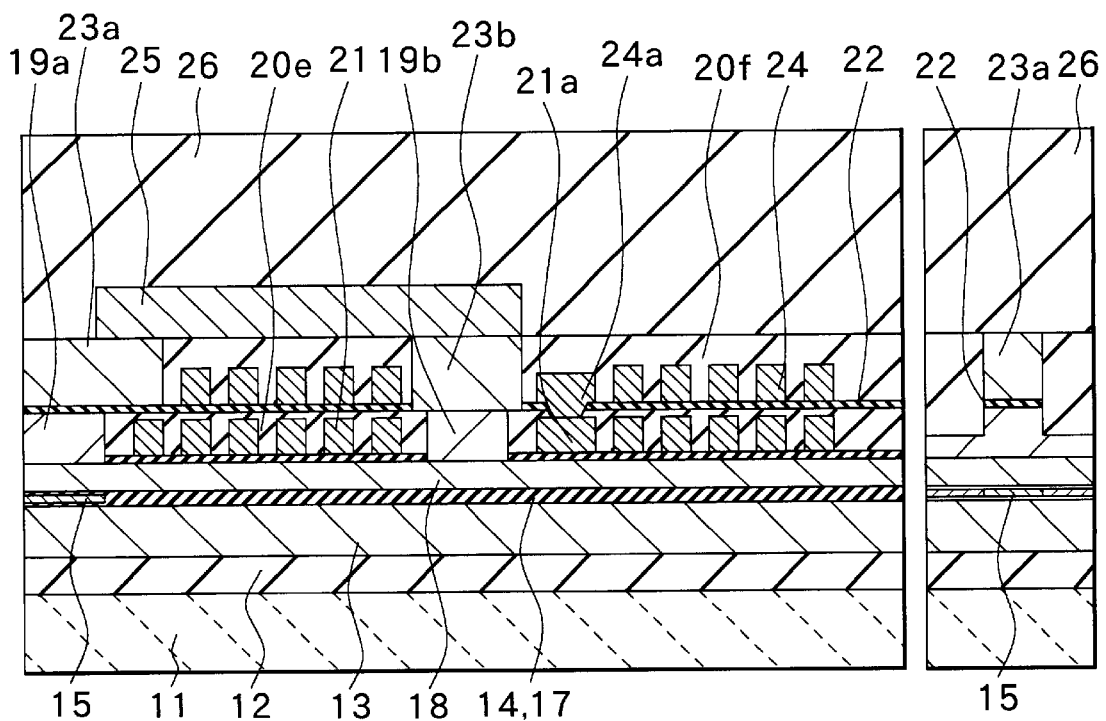
FIGS. 14A and 14B are cross sections for describing the following step shown in FIGS. 13A and 13B.

As shown in FIGS. 14A and 14B, the top pole layer 25 is formed using, for example, the same material as the top pole tip 23a by, for example, electroplating or sputtering. The top pole layer 25 has a contact with the bottom connecting portion 19b sandwiching the top connecting portion 23b in a rearward position of the thin film coils 21 and 24 viewed from the track surface side, and is magnetically coupled to the bottom pole layer 18. At last, the overcoat layer 26 of about 30 $\mu$m in film-thickness made of alumina is formed on the top pole layer 25 by, for example, sputtering. After that, a thin magnetic head is completed by processing the slider and by forming the track surface (ABS) of the recording head and the reproducing head.

In the embodiment, the thin film coil 21 of the first layer is formed on the top shield-cum-bottom pole layer 18 sandwiching the insulating layer 20d and the insulating layer 20e is formed to cover the thin film coil 21. The bottom pole tip 19a and the bottom connecting portion 19b is formed by the planarizing process using the insulating layer 20e. Therefore, the same effect as the first embodiment is obtained. Furthermore, in the embodiment, as the thin film coil 21 is buried in the insulating layer 20e adjacent to the bottom pole tip 19a, and the thin film coil 24 of the second layer is buried in the insulating layer 20f adjacent to the top pole tip 23a, the top pole layer 25 is formed on the flat surface. Accordingly, the top pole layer 25 can be further scaled down.

In the embodiment, as described in the step of FIGS. 13A and 13B, the top pole tip 23a and the top connecting portion 23b are formed on the write gap layer 22. After that, the thin film coil 24 is formed in the concave region formed between the top pole tip 23a and the top connecting portion 23b and further the insulating layer 20f is formed thereon. Then, the surface is planarized by CMP. The top pole tip 23a and the top connecting portion 23b may be formed with the same method as the method of forming the bottom pole tip 19a and the bottom connecting portion 19a. The method will be described in the followings with reference to FIGS. 12A and 12B, and FIGS. 13A and 13B.

First, as shown in FIGS. 12A and 12B, the opening 22a for connecting the top pole and the bottom pole is formed by patterning the write gap layer 22 by photolithography and the opening 22b for connecting the of the coils facing the connecting portion 21a of the thin film coil 21, and then the thin film coil 24 of the second layer is formed. After forming the insulating layer 20f on the thin film coil 24 and the write gap layer 22, the opening is formed by patterning the insulating layer 22f by photolithography corresponding to the top pole tip and the top connecting portion. Subsequently, the magnetic layer is formed on the insulating layer 20f and the write gap layer 22 and is planarized by CMP to expose the surface of the insulating layer 20f. As a result, the top pole tip 23a is formed on the write gap layer 22, and the top connecting portion 23b connecting to the bottom connecting portion 19b is formed as well.

[Third Embodiment]

Figures 15A, 15B:
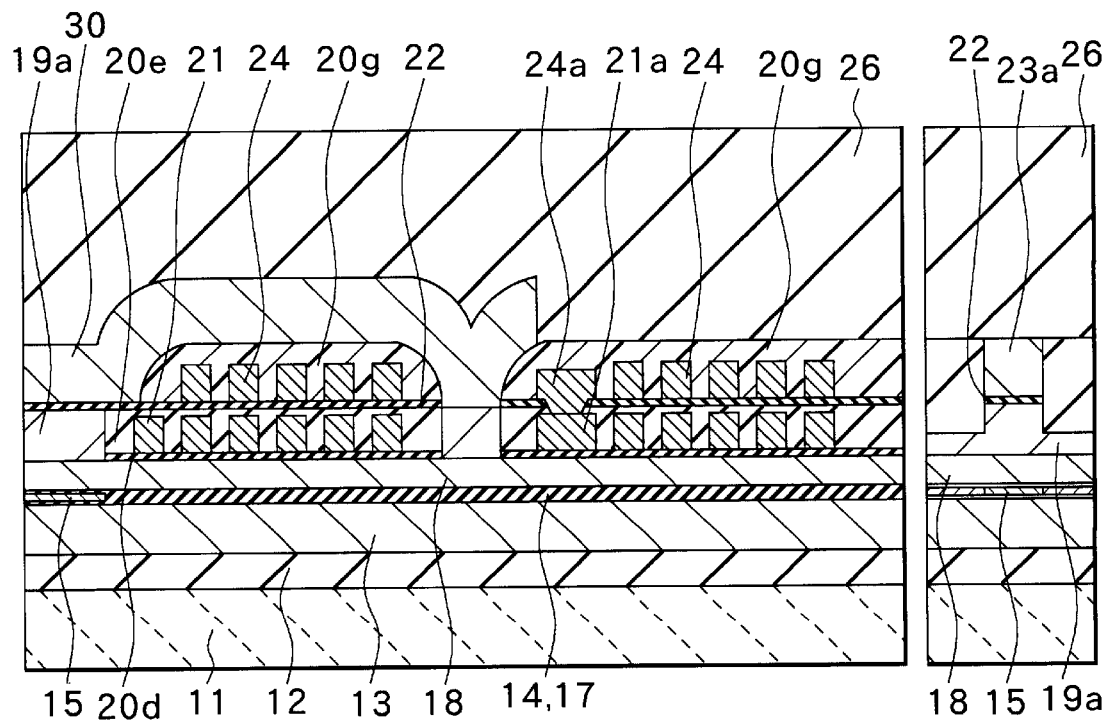
FIGS. 15A and 15B are cross sections for describing a process of manufacturing the thin film magnetic head according to a third embodiment of the invention.

A third embodiment of the invention will be described with reference to FIGS. 15A and 15B. The embodiment use the same steps as the second embodiment up to form the thin film coil 24 of the second layer in FIGS. 13A and 13B so that the description is omitted. In the embodiment, a photoresist film 20g is formed in a predetermined pattern by high-precision photolithography on the thin film coil 24 and the write gap layer 22. And then, the heat treatment with predetermined temperature is applied to planarize the photoresist film 20g and to insulate the turns of the thin film coil 24. A top pole layer 30 is formed using, for example, the same material as the top pole tip 23a by, for example, electroplating or sputtering. The top pole layer 30 represents the structure integrated the top pole tip 23a, the top connecting portion 23b and the top pole layer 25, however the tip of the top pole layer 30 is exposed on the track surface. The following steps are the same as the second embodiment.

In the embodiment, like the second embodiment, after forming the insulating layer 20a on the bottom pole layer 18, the bottom pole tip 19a is formed adjacent to the insulating layer 20a by the planarizing process using the insulating layer 20a. Therefore, the description of the effects are omitted.

[Fourth Embodiment]

A method of manufacturing a composite thin film magnetic head as a thin film magnetic head according to a fourth embodiment of the invention will be described with reference to FIGS. 16A and 16B through FIGS. 22A and 22B. FIGS. 16A to 22A show the cross sections vertical to the track surface (ABS), and FIGS. 16B to 22B show the cross sections parallel to the track surface of the magnetic pole.

In a method of manufacturing according to the embodiment, first, as shown in FIGS. 16A and 16B, an insulating layer 102, made of, for example, alumina ($Al_2O_3$) is deposited with about 5 $\mu$m in thickness on a substrate 101 made of, for example, altic ($Al_2O_3$. TiC). On the insulating layer 102, a bottom shield layer 103 for the reproducing head made of the magnetic material such as permalloy is formed with about 3 $\mu$m in thickness. The bottom shield layer 103 is selectively formed on the insulating layer 102 by plating using, for example, the photoresist film as a mask. Next, although it is not shown in the figure, a insulating layer made of, for example, alumina is formed with, for example, about 4 to 5 $\mu$m in thickness on all over the surface and its surface is polished by, for example, CMP(Chemical and Mechanical Polishing) till the bottom shield layer 103 is exposed and then the surface is planarized.

As shown in FIGS. 17A and 17B, a bottom shield gap film 104 as the insulating layer is formed by depositing, for example, alumina or aluminum nitride on the bottom shield layer 103 by sputtering. On the bottom shield gap film 104, the MR film for forming an MR element 105 for reproducing is formed in tens of nanometers in thickness. On the MR film, the photoresist pattern is selectively formed in the predetermined position to form the MR element 105. By using the photoresist pattern as a mask, the MR film is etched by, for example, ion milling and then the MR element 105 is formed. The MR element 105 may be formed of the GMR element as well as the AMR element. Subsequently, on the bottom shield gap film 104, a pair of electrode layer 106 electrically connected to the MR element 105 is formed with a tens of nanometers in thickness using the same photoresist pattern as a mask. On the bottom shield gap film 104 and the MR element 105, a top shield gap film 107 as the insulating layer is formed. The MR element 105 is buried in the shield gap films 104 and 107. On the top shield gap film 107, a first portion of the top shield-cum-bottom pole layer (referred to as a bottom pole layer hereinafter) 108a for the reproducing and the recording heads made of the magnetic materials is selectively formed in a thickness of about 1.0 to 1.5 $\mu$m. The bottom pole layer 108a is located in the region including the interior region facing the whole thin film coil described hereinafter.

As shown in FIGS. 18A and 18B, a second portion of the bottom pole layer 108b and a third portion of the bottom pole layer 108c are formed in a thickness of 1.5 to 2.5 $\mu$m on the first bottom pole layer 108a. The bottom pole layer 108b forms the magnetic pole of the bottom pole layer (that is, bottom pole tip) and is connected to the bottom pole layer 108a. The bottom pole layer 108c is for connecting the bottom pole layer 108a and the top pole layer (that is, the bottom connecting portion). In the embodiment, the position of the end of the bottom pole layer 108b opposite to the air bearing surface (the right side in the figure) determines the throat height. In other words, the position is the throat height zero position.

The bottom pole layers 108b and 108c may be formed of NiFe (Ni: 80% by weight, Fe: 20% by weight) as well as the high saturated flux density material such as NiFe (Ni: 45% by weight, Fe: 55% by weight) by plating, or of the high saturated flux density materials such as FeN, FeZrN or the like by sputtering. Another high saturated flux density materials such as CoFe, Co base amorphous materials or the like may be used as well.

The bottom pole layers 108b and 108c can be formed like the first embodiment. That is, after forming the insulating layer having the opening corresponding to the bottom pole layers 108b and 108c on the bottom pole layer 108a by, for example, sputtering, the magnetic layer is formed on the insulating layer and the bottom pole layers and then the magnetic layer is polished by CMP and the surface of the insulating layer is exposed.

An insulating film 110 made of, for example, alumina is formed all over the bottom pole layers. Preferably, the thickness of the insulating film 110 is equal to or less than 1 μm. If the insulating film is thicker than 1 μm, the yoke length would be too long. In the embodiment, the insulating film 110 is formed with a thickness of about 0.3 to 0.6 μm.

Although it is not shown in the figure, a seed layer for forming a thin film coil of a first layer by plating is formed by, for example, sputtering. On the seed layer, the photoresist is coated and a frame 111 is formed for plating by patterning the seed layer by photolithography.

In the embodiment, the thin film coil of a first layer is located in the periphery of the bottom pole layer 108c on the bottom pole layer 108c and the frame 111 is formed to make part of the thin film coil passes through between the bottom pole layers 108b and 108c.

A thin film coil 112 of a first layer made of, for example, copper (Cu), is formed with, for example, about 1.0 to 2.0 μm in thickness by frame plating using the frame 111. The coil pitch of the thin film coil 112 is about 1.2 to 2.0 μm, for instance.

With these steps, in the embodiment, the thin film coil 112 is located in the periphery of the bottom pole layer 108c on the bottom pole layer 108a to make part of the thin film coil 112 passes through between the bottom pole layers 108b and 108c.

As shown in FIGS. 19A and 19B, after removing the frame 111 and the underlying seed layer, an insulating layer 113 of about 3 to 4 μm in thickness made of, for example, alumina is formed all over the thin film coil 112. After that, the surface of the insulating layer 113 is polished until the surfaces of the bottom pole layers 108b and 108c are exposed by, for example, CMP and then the surface is planarized. In FIGS. 19A and 19B, although the thin film coil 112 is not exposed by planarization, it may be exposed. However, if a connecting portion 112a of the thin film coil 112 connecting with a thin film coil of a second layer which will be described later is not exposed by planarization, the connecting portion 112a needs to be exposed by photolithography.

As shown in FIGS. 20A and 20B, a write gap layer 114 made of the insulating material is formed on the bottom pole layers 108b and 108c and the insulating layer 113 with a thickness of 0.2 to 0.3 μm. General examples of the insulating materials for forming the write gap layer 114 are alumina, aluminum nitride, silicon oxide base materials, and silicon nitride base materials.

The write gap layer 114 are partially etched to form the contact holes for forming the yoke in the upper part of the bottom pole layer 108c and for connecting the connecting portion 112a of the thin film coil of the first layer and the thin film coil of a second layer in the upper part of the connecting portion 112a.

On the write gap layer 114, a second portion of the top pole layer 115b is formed with a thickness of 2.0 to 3.0 μm and a third portion of the top pole layer 115c is formed with a thickness of 2.0 to 3.0 μm on the bottom pole layer 108c. The top pole layer 115b forms the magnetic pole of the top pole layer (that is, a top pole tip) and is connected to a first top pole layer 115a described hereinafter. The top pole layer 115c for connecting the top pole layer 115a and the bottom pole layer (top connecting portion). In the embodiment, the length of the top pole layer 115b is longer than that of the bottom pole layer 108b. The top pole layer 115b is formed to overlap part of the thin film coil 112 sandwiching the write gap layer 114.

The top pole layers 115b and 115c may be formed of, NiFe (Ni: 80% by weight, Fe: 20% by weight) as well as the high saturated flux density material such as NiFe (Ni: 45% by weight, Fe: 55% by weight) by plating, or of the high saturated flux density materials such as FeN, FeZrN or the like by sputtering. Another high saturated flux density materials such as CoFe, Co base amorphous materials or the like may be used as well.

Using the top pole layer 115b as a mask, the write gap layer 114 is selectively etched by dry etching with reactive Ion Etching (RIE) using, for example, chlorine base gas such as BCl$_2$, Cl$_2$ or the like, and fluorine base gas such as CF$_4$, SF$_6$ or the like. By selectively etching the bottom pole layer 108b in the order of about 0.3 to 0.6 μm, the trim structure is formed as shown in FIG. 20B. The structure suppresses the widening of the effective track width caused by the spreading of the magnetic flux at the time of writing data to the narrow track.

A insulating film 116 made of, for example, alumina is formed all over the write gap layer 114. Preferably, the thickness of the insulating film 116 is equal to or less than 1 μm. If the insulating film 116 is thicker than 1 μm, the yoke length would be too long. In the embodiment, the insulating film 116 is formed with a thickness of about 0.3 to 0.6 μm.

Although it is not shown in the figure, a seed layer for forming a thin film coil of a second layer by plating is formed by, for example, sputtering. On the seed layer, the photoresist is coated and a frame is formed for plating by patterning the seed layer by photolithography.

In the embodiment, the thin film coil of a second layer is located in the periphery of the top pole layer 115c and the frame is formed to make part of the thin film coil passes through between the top pole layers 115b and 115c.

A thin film coil 118 of a second layer made of, for example, copper (Cu), is formed with, for example, about 1.0 to 2.0 μm in thickness by frame plating using the frame. The coil pitch of the thin film coil 118 is about 1.2 to 2.0 μm, for instance. A connecting portion 118a of the thin film coil 118 placed on the connecting portion 12a of the thin film coil 112 is connected through the contact hole.

With these steps, in the embodiment, part of the thin film coil 118 is located between the top pole layers 115b and 115c.

Figures 21A, 21B:
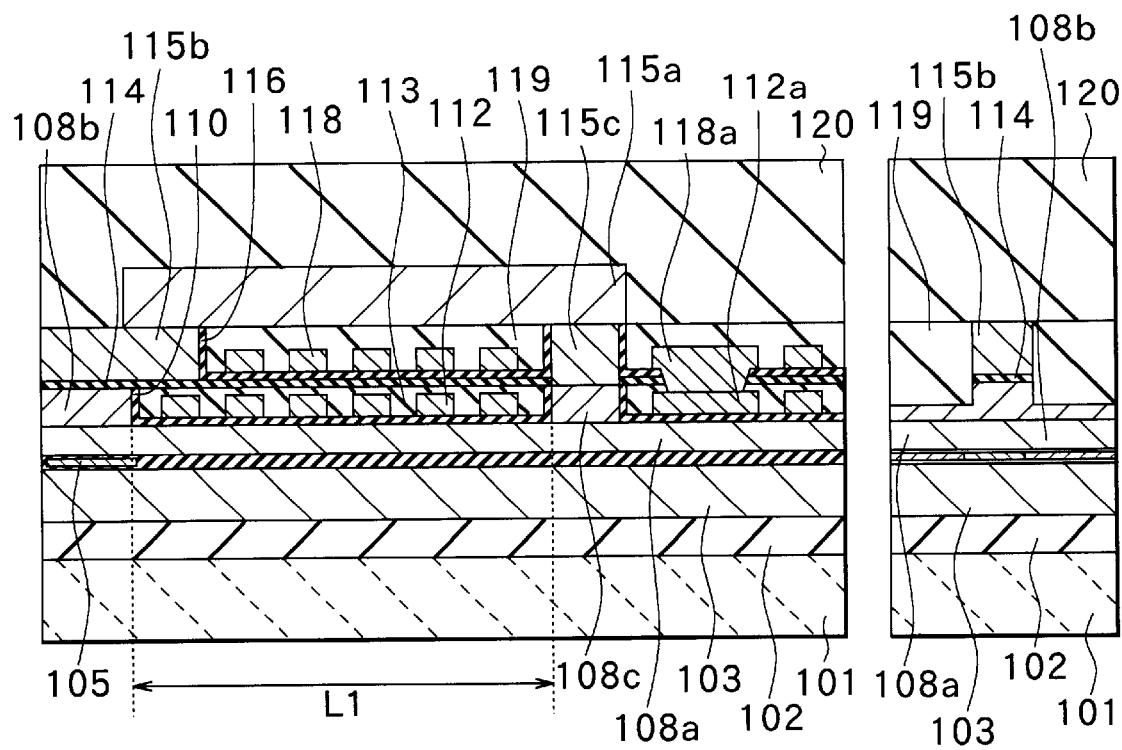
FIGS. 21A and 21B are cross sections for describing the following step shown in FIGS. 20A and 20B.

As shown in FIGS. 21A and 21B, after removing the frame and the underlying seed layer, an insulating layer 119 of about 3 to 4 μm in thickness made of, for example, alumina is formed all over the thin film coil 118. After that, the surface of the insulating layer 119 is polished until the surfaces of the top pole layers 115b and 115c are exposed by, for example, CMP and then the surface is planarized.

On the planarized top pole layers 115b and 115c and insulating layer 119, a first portion of the top pole layer 115a made of the magnetic material for the recording head is formed with, for example about 2 to 3 μm in thickness. The top pole layer 115a is located in the region including the interior region facing the thin film coils 112 and 118 between the top pole layers 115b and 115c. The top pole layer 115a is in contact with and magnetically coupled to the bottom pole layer 108c sandwiching the top pole layer 115c. The top pole layer 115a may be formed of NiFe (Ni: 80% by weight, Fe: 20% by weight) as well as the high saturated flux density material such as NiFe (Ni: 45% by weight, Fe: 55% by weight) by plating, or of the high saturated flux density materials such as FeN, FeZrN or the like by sputtering. Another high saturated flux density materials such as CoFe, Co base amorphous materials or the like may be used as well. The top pole layer 115a may have a stacked structure having a several inorganic insulating films and the magnetic layers made of permalloy or the like to improve the high frequency characteristics.

In the embodiment, the end surface of the top pole layer 115a facing the recording medium (the air bearing surface side) is located far from the side of the thin film magnetic head facing the recording medium (the right side in the figure ).

On the top pole layer 115a, an overcoat layer 120 made of, for example, alumina is formed in a thickness of about 20 to 40 µm. After planarizing the overcoat layer 120, a pad for electrode, not shown in the figure, is formed thereon. Finally, a thin magnetic head of the embodiment is completed by processing the slider and by forming the track surface (ABS) of the recording and the reproducing heads.

In the embodiment, the bottom pole layer comprising the first portion 108a, the second portion 108b and the third portion 108c corresponds to the one magnetic layer of the invention and the top pole layer comprising the first portion 115a, the second portion 115b and the third portion 115c corresponds to the other magnetic layer of the invention.

Figure 22:
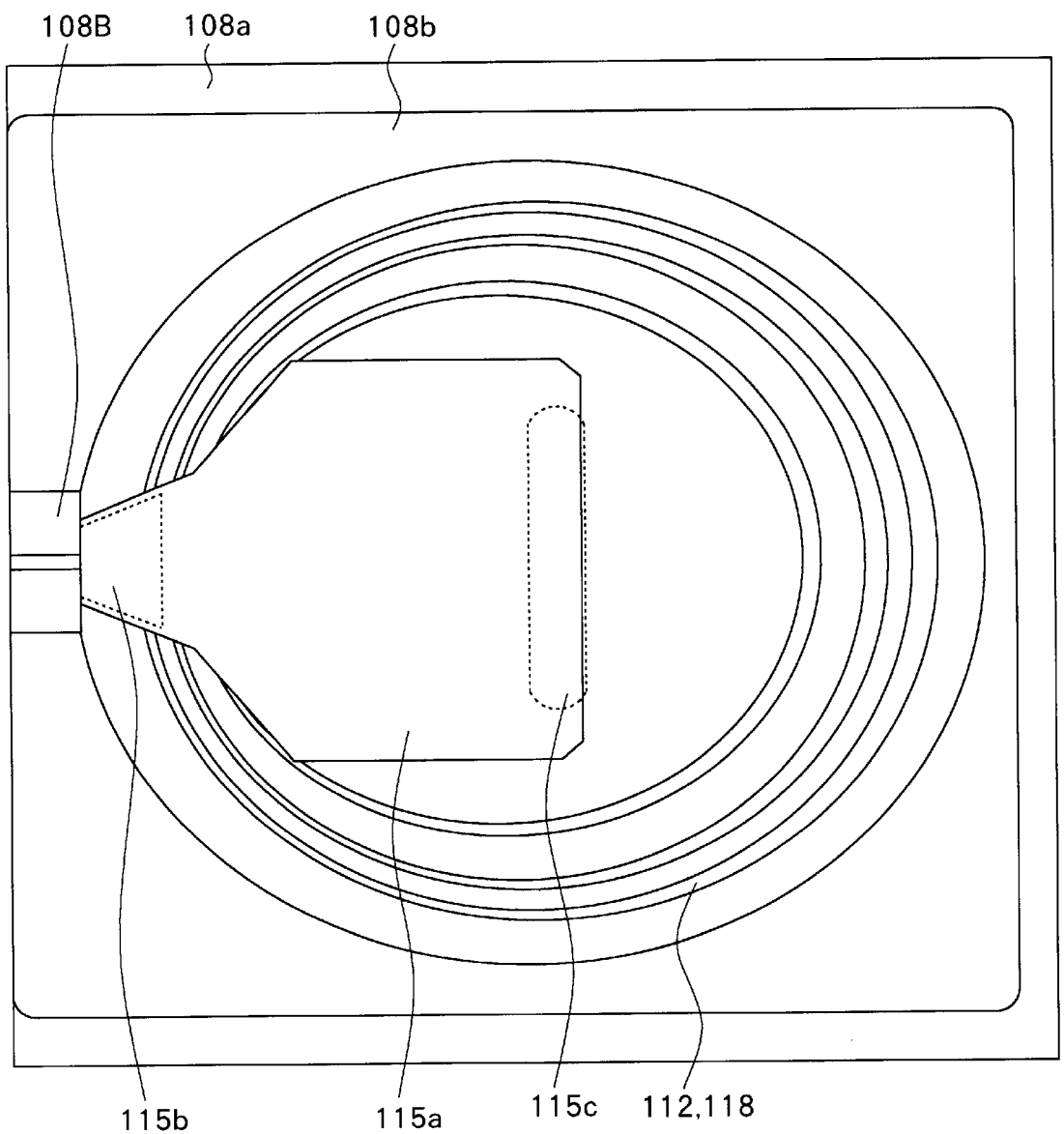
FIG. 22 is a plan view of a main part of the thin film magnetic head manufactured according to a fourth embodiment of the invention.

FIG. 22 is a plan view of the thin film magnetic head manufactured according to the embodiment as described above. In the figure, the overcoat layer 120 is omitted. The numeral 108B indicates the etching part of the bottom pole layer 108b to have a trim structure.

As shown in FIG. 22, the bottom pole layer 108a is located in the region including the interior region opposite to the whole thin film coils 112 and 118. As a result, according to the embodiment, the whole thin film coil 112 of the first layer can be formed on the bottom pole layer 108a having no steps sandwiching the insulating layer 110. This enables microfabrication of the thin film coil 112. Also, in the embodiment, since the thin film coil 118 of the second layer is formed on the flat surface of the write gap layer 114, the microfabrication of the thin film coil 118 is possible. With the aforementioned reasons, according to the embodiment, the coil pitch of the thin film coils 112 and 118 can be reduced. This brings the shortening of the yoke length of the recording head compared to the related art, for example, by 30 to 40%. Therefore, according to the embodiment, the thin film magnetic head having the excellent high frequency characteristics can be provided. In the embodiment, the length of the coil can be shortened substantially, with the same number of the turns of the coil. As a result, the thickness of the coil can be reduced in the order of 1 to 1.5 µm, for instance, whereas the coil of the related art is 2 to 3 µthick.

Figures 31A, 31B:
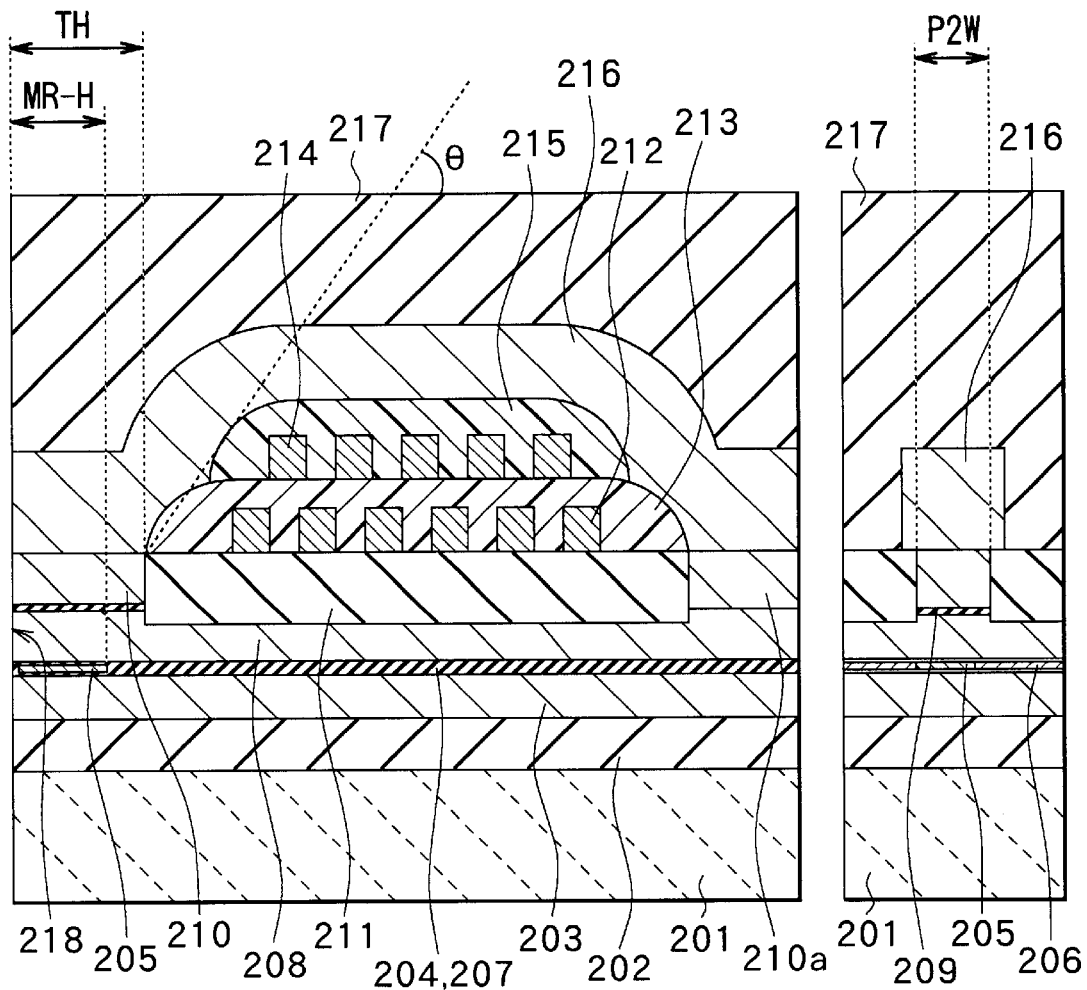
FIGS. 31A and 31B are cross sections for describing the following step shown in FIGS. 30A and 30B.

When the yoke length of the thin film coils 112 and 118 of the embodiment is $L_1$ as shown in FIG. 21 with the same design rule as the conventional example, as shown in FIG. 31, $L_1$ is 14.5 µm as a example of a specific numeral of the yoke length.

According to the embodiment, microfabrication of the bottom pole layer 108b and the top pole layer 115b for forming the magnetic pole of the recording head is possible as these layers are formed on the flat surface. This brings the reduction of the track width of the recording head since the top pole layer 115b which determines the track width of the recording head can be formed with half-micron or quarter-micron in width. This allows the thin film magnetic head to have the surface recording density of 20 gigabit to 30 gigabit per square inch required in the future.

According to the embodiment, the throat height is determined by the bottom pole layer 108b which is formed as a wide pattern using photolithography as shown in FIGS. 23. As a result, compared to the case where the throat height is determined by the magnetic pole of the top pole layer which requires microfabrication, the position of the end of the pattern can be precisely controlled and thus the throat height is precisely determined.

In the embodiment, the end surface of the top pole layer 115a on the air bearing surface side is positioned far from the air bearing surface side of the thin film magnetic head. This suppresses the widening of the effective track width with the short throat height, as the top pole layer 115a is not exposed on the air bearing surface and thus the side-write does not occur.

In the embodiment, the insulating film 110 made of the inorganic material, which is thin and can obtain sufficient dielectric strength, is formed between the bottom pole layer (108a, 108b, 108c) and the thin film coil 112. As a result, the large dielectric strength can be obtained between the bottom pole layer and the thin film coil 112. On the other hand, the write gap layer 114, the insulating layer 113 and the insulating film 116 made of the inorganic materials are formed between the thin film coils 112 and 118. Therefore, the large dielectric strength can be obtained between the thin film coils 112 and 118 and the leakage of the magnetic flux is reduced from the thin film coils 112 and 118.

Moreover, in the embodiment, as shown in FIG. 22, the bottom pole layer 108b is positioned widely around the thin film coils 112 and 118 and thus it is easy to perform the planarization after forming the thin film coil 112.

[Fifth Embodiment]

Figures 23A, 23B:
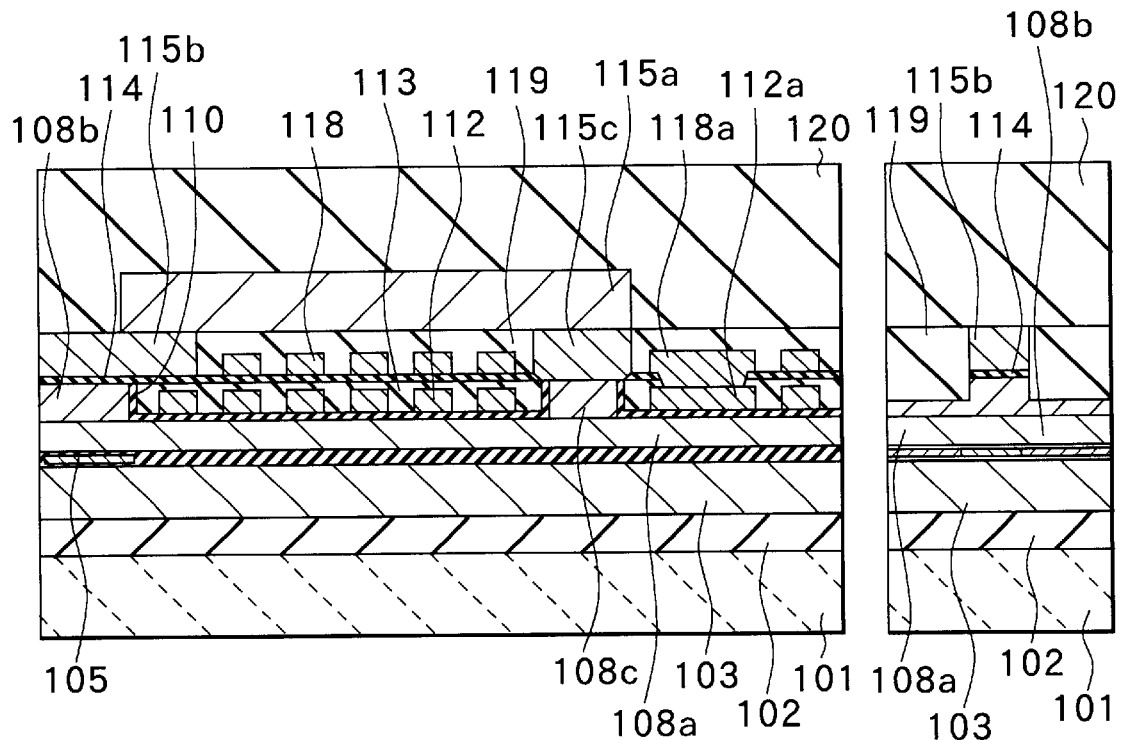
FIGS. 23A and 23B are plan views of a main part of the thin film magnetic head manufactured according to a fifth embodiment of the invention.

First, the thin film magnetic head according to a fifth embodiment of the invention will be described with reference to FIGS. 23A and 23B.

In the thin film magnetic head of the embodiment, the insulating film 116 formed beneath the thin film coil 118 in the thin film magnetic head of the fourth embodiment is removed and the thin film coil 118 is formed on the write gap layer 114 directly. A method of manufacturing the thin film head of the embodiment is the same as that of the fourth embodiment except the step of forming the insulating film 116.

The configuration of the thin film magnetic head and the effects are the same as that of the fourth embodiment.

[Sixth Embodiment]

Figures 24A, 24B:
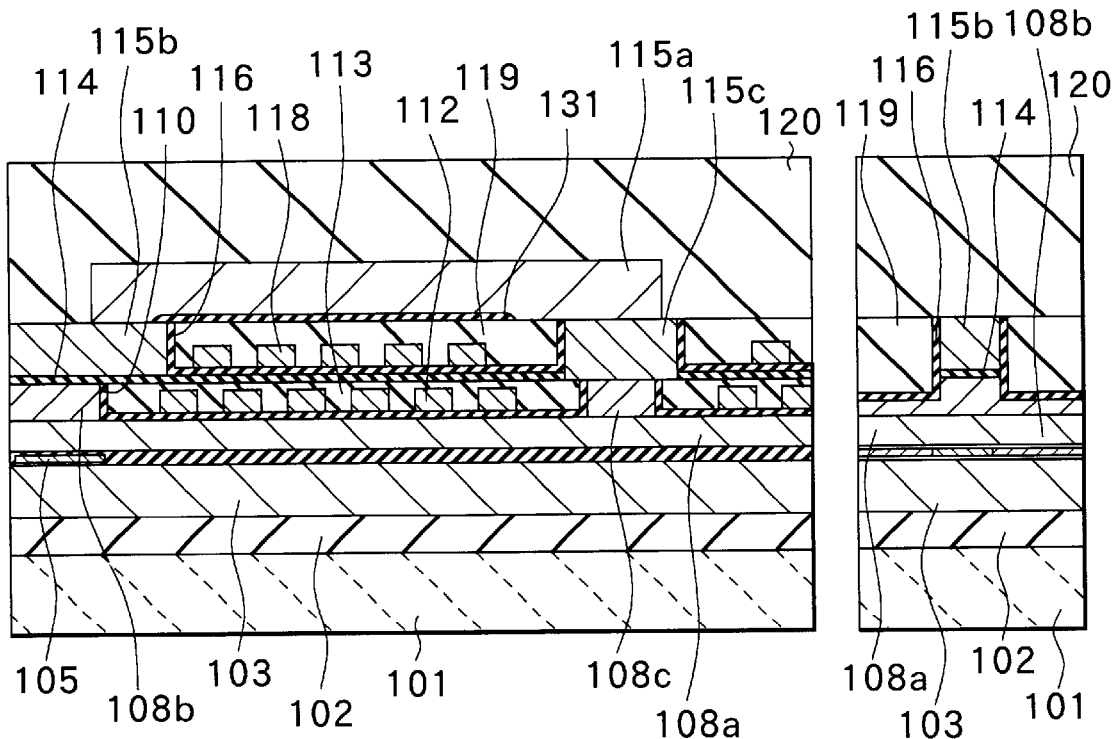
FIGS. 24A and 24B are plan views of a main part of the thin film magnetic head manufactured according to a sixth embodiment of the invention.

First, the thin film magnetic head according to a sixth embodiment of the invention will be described with reference to FIGS. 24A and 24B.

In the thin film magnetic head according to the embodiment, the top surface of the thin film coil 118 in the fourth embodiment is formed in the same height as the top surfaces of the top pole layers 115b and 115c. On the thin film coil 118 provided between the top pole layers 115b and 115c, an insulating layer 131 made of, for example, photoresist is formed to insulate the thin film coil 118 and the top pole layer 115a.

In the method of manufacturing the thin film magnetic head of the embodiment, the insulating layer 119 is polished by, for example, CMP until the top pole layers 115b and 115c are exposed and then the surface of the insulating layer 119 is planarized in the method of manufacturing the thin film head of the fourth embodiment and at the time of the planarization, the thin film coil 118 is also exposed. After that, the insulating layer 131 is formed on the thin film coil 118 provided between the top pole layers 115b and 115c.

The configuration of the thin film magnetic head and the effects are the same as that of the fourth embodiment.

[Seventh Embodiment]

Figures 25A, 25B:
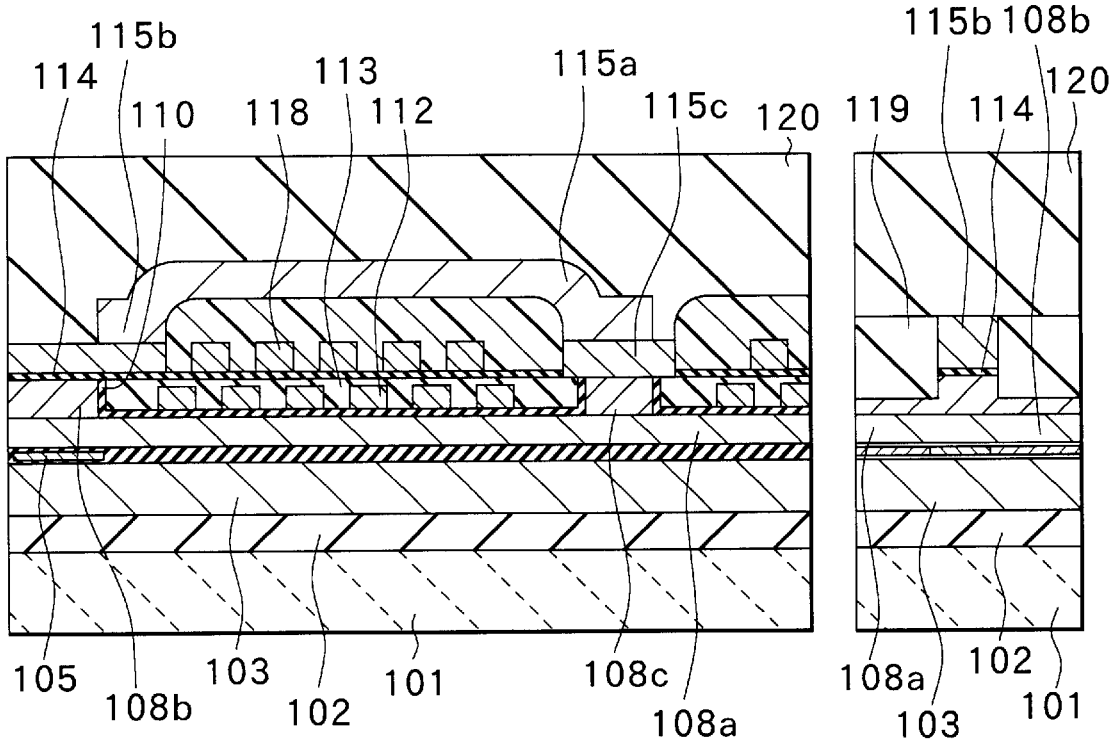
FIGS. 25A and 25B are plan views of a main part of the thin film magnetic head manufactured according to a seventh embodiment of the present invention.

First, the thin film magnetic head according to a seventh embodiment of the invention will be described with reference to FIGS. 25A and 25B.

In the thin film magnetic head of the embodiment, the thin film coil 118 is formed on the write gap layer 114 directly like the fifth embodiment and the thin film coil 118 is covered with a photoresist layer 141. In the embodiment, the top pole layer 115a is formed on the top pole layers 115b and 15c and the photoresist layer 141.

In the embodiment, since the top pole layer 115a is not formed on the flat surface, one of the effects in the first embodiment brought by the top pole layer 115a which is formed on the flat surface cannot be obtained.

However, according to the embodiment, the manufacturing cost can be reduced with less steps of CMP.

The con figuration of the thin Mm magnetic head and the effects are the same as that of the first embodiment.

Although the invention has been described by some embodiments, the invention is not limited to the foregoing embodiments but can be variously modified. For example, in the above described embodiments, the magnetic layers such as top pole tip 23a and the top pole layer 25 and so on are made of NiFe (Ni: 50% by weight, Fe: 50% by weight), NiFe (Ni: 80% by weight, Fe: 20% by weight), and the high saturation magnetic flux density materials such as FeN, FeCoZr and so on, however, a configuration of stacking more than two kinds of the materials may be possible.

In the second and the third embodiments, the thin film coil buried in the insulating layer 20e adjacent to the bottom pole tip 19a is the first layer of the coil, however, the stacked coils with two or more layers can be used as well. Further, in these embodiment, the insulating layers 20b, 20e, and 20f are formed of alumia, silicon dioxide or silicon nitride. However, for example, after covering the thin film coil with thin film made of alumina, the concave portion of the surface of the insulating layers may be buried with SOG (Spin On Glass) film and then the surface may be planarized.

In the fourth to seventh embodiments, both of the bottom and top pole layers have the first, second and the third portions. Also, both layers of the two-layered thin film coil comprising the first layer 112 and the second layer 118 located to pass through between the bottom pole layers 108b and 108c, and between the top pole layers 115b and 115c, respectively. However, only the bottom pole layer may have the first, second and the third portions and the thin film coil may be located to make only the first layer 112 passes through between the bottom pole layers 108b and 108c.

In the above described embodiments, the throat height is determined by the bottom pole layer, however, it could be determined by the top pole layer.

Also, the bottom pole corresponds to one pole layer of the invention and the top pole corresponds to the other pole layer of the invention in the above mentioned embodiments, however it may be reversed.

Further, the invention can be applied to the method of manufacturing the thin film magnetic head which reversed the order of stack of the elements for writing and reproducing. Namely, the inductive-type magnetic transducer for writing is formed on the substrate side and the MR element for recording is formed thereon. For instance, this is achieved by forming the magnetic film having the functions of the top pole layer shown in the above mentioned embodiments on the substrate side as the bottom pole layer and forming the magnetic film having the functions of the bottom pole layer shown in the above mentioned embodiments as the top pole layer facing the bottom pole layer sandwiching the write gap layer. In this case, preferably, the top pole layer of the inductive-type magnetic transducer also serves as the bottom shield layer of the MR element.

It is preferable for the thin film magnetic head with such a structure to use the substrate forming the concave portion. By forming the coil on the concave portion of the substrate, the reduction of the thickness of the thin film magnetic head can be further achieved.

The invention is applicable to the thin film magnetic head comprising only the inductive-type magnetic transducer for both reading and writing.

As described, according to the method of the thin film magnetic head of the invention, the insulating layer is formed on the magnetic layer and then the magnetic layer is planarized by using the insulating layer. It makes easier to form the magnetic pole adjacent to the insulating layer. As a result, by making the length of the end surface of the insulating layer from the surface facing the recording medium of the magnetic pole equal to the throat height of the recording head, the effects such that the throat height can be determined precisely or the like are obtained.

According to another method of the thin film magnetic head of the invention, the thin film coil is buried in the second insulating layer in advance. This enables the planarization of the coil forming portion in addition to the above mentioned effects. Thus the effects such that the top pole layer can be further scaled down or the like are obtained.

Moreover, according to the thin film magnetic head of the invention, the one magnetic layer comprises: the first portion located in the region including the interior region oppose to the whole thin film coil; the second portion forming the magnetic pole and connecting to the first portion; and the third portion connecting the first portion and the other magnetic layer. As least part of the thin film coil is located to face to the first portion and pass through between the second portion and the third portion. As a result, the thin film head enables forming the thin film coil on the first portion of the first magnetic layer with no steps and thus the micro-fabrication of the thin film coil is possible. This brings the shortening of the yoke length of the recording head.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head having at least two magnetic layers including two magnetic poles being magnetically coupled to each other, part of sides of which facing the recording medium face each other sandwiching a write gap layer, and at least one layer of thin film coil for generating magnetic flux, including the steps of:

selectively forming an insulating layer in a pattern having at least an opening corresponding to a first magnetic pole on a planar magnetic layer;

forming the first magnetic pole magnetically coupled to part of the planar magnetic layer by using the pattern of the insulating layer; and forming a first thin film coil on the insulating layer, wherein the insulating layer having the pattern with an opening corresponding to the first magnetic pole is selectively formed on the planar magnetic layer and magnetic material is deposited on the insulating layer and the planar magnetic layer, and then the first magnetic pole which is magnetically coupled to part of the planar magnetic layer is formed by planarization to be the same height as the surface of the insulating layer.

2. A method of manufacturing the thin film magnetic head having at least two magnetic layers including two magnetic poles being magnetically coupled to each other, part of sides of which facing the recording medium face each other sandwiching a write gap layer, and at least one layer of the thin film coil for generating magnetic flux, including the steps of:

forming a first insulating layer on a planar magnetic layer;

forming a thin film coil on the first insulating layer and then forming a second insulating layer to cover the thin film coil;

patterning the first and the second insulating layers to include at least an opening corresponding to a first magnetic pole; and forming the first magnetic pole to be magnetically coupled to part of the planar magnetic layer by using the patterns of the first and the second insulating layers, wherein the first magnetic pole which is magnetically coupled to part of the planar magnetic layer is formed by depositing a magnetic material on the planar magnetic layer and the second insulating layer and planarizing at least the magnetic material to be the same height as a surface of the second insulating layer.

* * * * *